(12) United States Patent
Funamoto et al.

(10) Patent No.: US 7,265,743 B2
(45) Date of Patent: Sep. 4, 2007

(54) IMAGE DISPLAY APPARATUS AND IMAGE DISPLAY METHOD

(75) Inventors: Taro Funamoto, Ibaraki (JP); Wataru Machidori, Amagasaki (JP); Takahiro Kobayashi, Okayama (JP); Yoshihito Ota, Okayama (JP); Katsuyuki Arimoto, Okayama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 289 days.

(21) Appl. No.: 10/837,628

(22) Filed: May 4, 2004

(65) Prior Publication Data

US 2004/0201561 A1 Oct. 14, 2004

Related U.S. Application Data

(62) Division of application No. 09/743,324, filed as application No. PCT/JP00/02938 on May 9, 2000, now Pat. No. 6,795,053.

(30) Foreign Application Priority Data

| May 10, 1999 | (JP) | ............................. 1999/128602 |
| Jul. 23, 1999 | (JP) | ............................. 1999/209946 |
| Jul. 23, 1999 | (JP) | ............................. 1999/209947 |
| May 10, 1919 | (JP) | ............................. 1999/128603 |

(51) Int. Cl.
*G09G 3/36* (2006.01)

(52) U.S. Cl. ...................... 345/102; 345/101

(58) Field of Classification Search ................. 345/84, 345/87, 89, 102, 101; 349/61
See application file for complete search history.

(56) References Cited

U.S. PATENT DOCUMENTS 5,313,292 A 5/1994 Wood et al.
5,406,305 A 4/1995 Shimomura et al.
5,717,422 A 2/1998 Fergason
6,111,559 A * 8/2000 Motomura et al. .......... 345/102
6,384,809 B1 5/2002 Smith
6,388,388 B1 * 5/2002 Weindorf et al. ........ 315/169.3

(Continued)

FOREIGN PATENT DOCUMENTS

CA 2146060 10/1995

(Continued)

*Primary Examiner*—Amr A. Awad
*Assistant Examiner*—Tom V Sheng
(74) *Attorney, Agent, or Firm*—Wenderoth, Lind & Ponack, L.L.P.

(57) ABSTRACT

An image display apparatus and method are provided for visually improving a sense of contrast by adjusting contrast and a light source to have a correlation. A characteristics detection part detects MAX, MIN, and APL (average) of an input signal. A control data generation part calculates Gain for amplifying a difference between MAX and MIN to a width of a dynamic range and Offset indicating the DC level to be shifted so that the input video signal amplified by Gain falls within the output dynamic range of a DC level adjustment part. A signal amplitude adjustment part amplifies the input video signal with reference to APL and in accordance with Gain. The DC level adjustment part shifts the DC level of the amplified input video signal in accordance with a value of Offset. A light source control part controls a light source so that a visual brightness level on a screen is equal to a brightness level of the input video signal.

12 Claims, 24 Drawing Sheets

U.S. PATENT DOCUMENTS

| | | |
|---|---|---|
| 6,388,649 B1 | 5/2002 | Tanaka et al. |
| 6,414,664 B1 | 7/2002 | Conover et al. |
| 7,053,881 B2 | 5/2006 | Itoh |
| 7,064,740 B2 * | 6/2006 | Daly .......................... 345/102 |
| 7,113,164 B1 | 9/2006 | Kurihara |
| 2003/0146919 A1 | 8/2003 | Kawashima et al. |
| 2004/0008177 A1 | 1/2004 | Ahn |
| 2004/0257329 A1 | 12/2004 | Park et al. |

FOREIGN PATENT DOCUMENTS

| | | | |
|---|---|---|---|
| JP | 62-19835 | | 1/1987 |
| JP | 01-136127 | * | 5/1989 |
| JP | 1-239589 | | 9/1989 |
| JP | 2-28184 | | 2/1990 |
| JP | 02261267 A | | 10/1990 |
| JP | 02311818 A | * | 12/1990 |
| JP | 4-88697 | | 7/1992 |
| JP | 5-66501 | | 3/1993 |
| JP | 5-127608 | | 5/1993 |
| JP | 7-130477 | | 5/1995 |
| JP | 8-201812 | | 8/1996 |
| JP | 11-65531 | | 3/1999 |

* cited by examiner

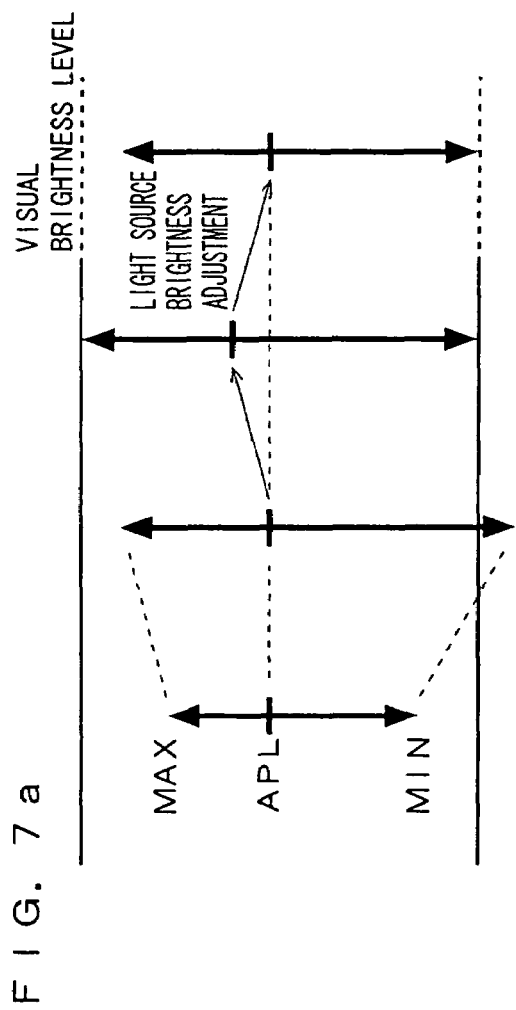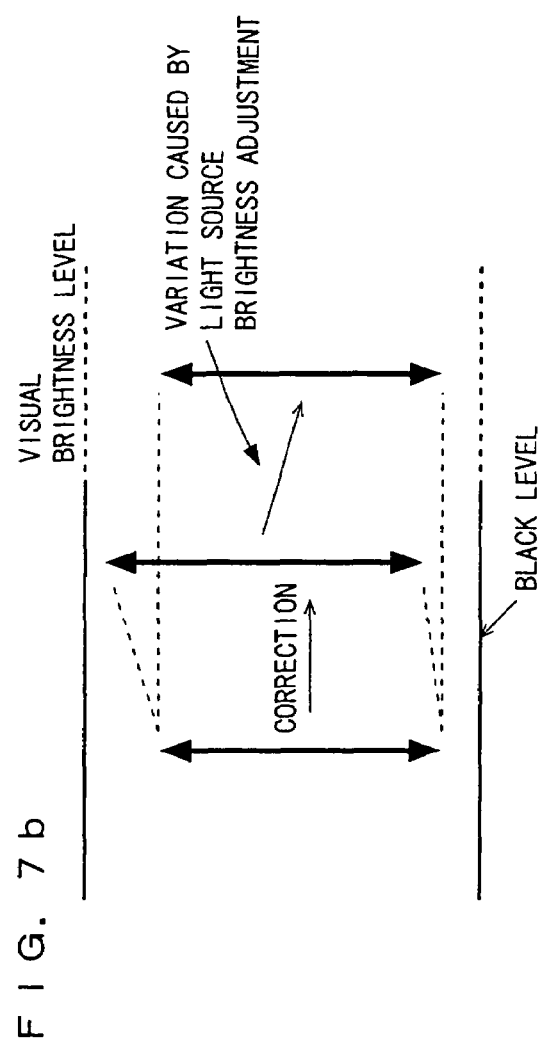

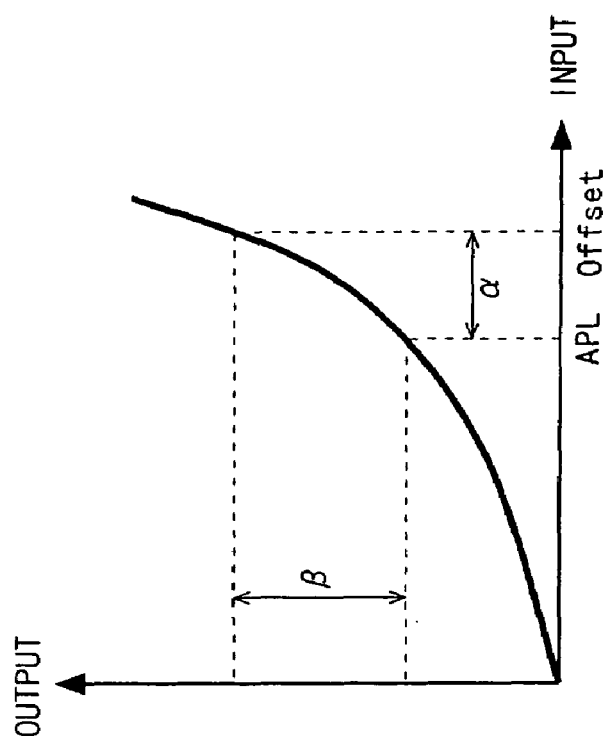
F I G. 9b
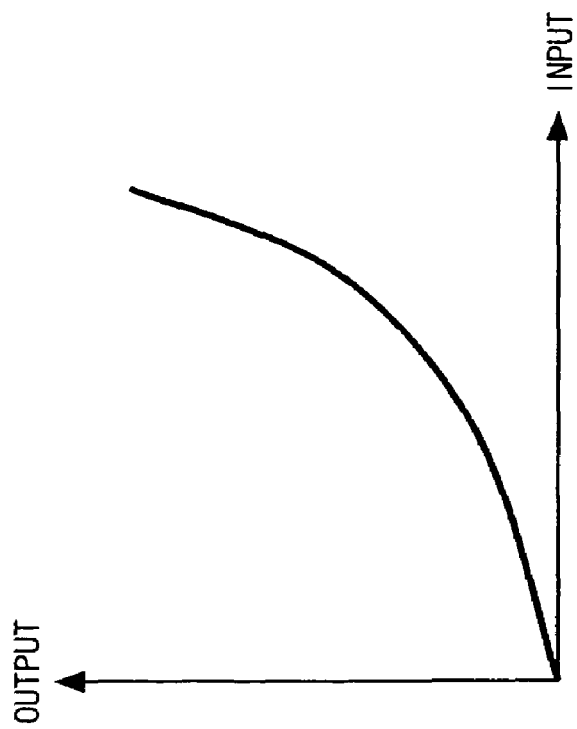
F I G. 9a

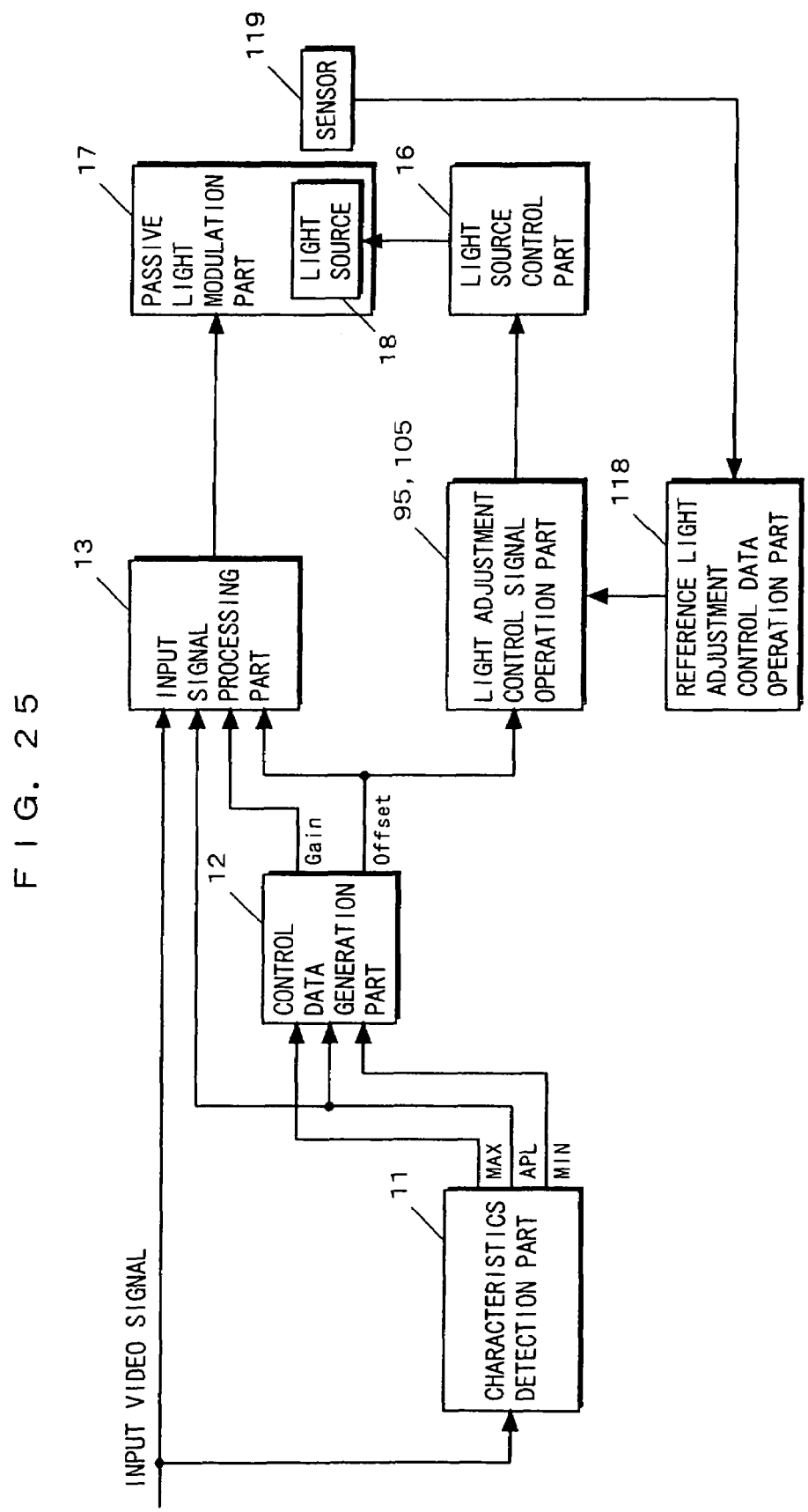

IMAGE DISPLAY APPARATUS AND IMAGE DISPLAY METHOD

This is a Divisional Application of U.S. application Ser. No. 09/743,324, filed Jan. 9, 2001 now U.S. Pat. No. 6,795,053, which is the National Stage of International Application No. PCT/JP00/02938, filed May 9, 2000.

TECHNICAL FIELD

The present invention relates to image display apparatuses and image display methods and, more particularly, to an image display apparatus and method using a passive light modulation device and dynamically adjusting contrast and light source brightness according to an input video signal. Further, the image display apparatus and method of the present invention improve light-emitting efficiency of the light source at the time of dynamically adjusting intensity (light amounts) thereof according to the input signal.

BACKGROUND ART

As is well known, a large number of image display apparatuses are used as screen display apparatuses for a television receiver, computer, and the like. Among those, a passive light modulation type apparatus typified by a liquid crystal display apparatus, displays images on a passive light modulation part, which does not emit light by itself (liquid crystal panel, for example). Therefore, the screen of such apparatuses look dim as compared with display apparatuses of a light-emitting type such as CRTs. To cope with this, passive light modulation type image display apparatuses are generally provided with a light source (backlight, for example) which emits light from the rear side of a passive light modulation part therein to increase visual brightness of a display screen. Accordingly, brightness of the light source can be adjusted in addition to general contrast adjustment, thereby improving visibility of displayed images.

The levels of contrast and light source are basically adjusted manually by a user and fixedly set. In the recent years, however, to make the images more visible, various methods have been suggested to achieve dynamic adjustment of contrast and intensity of a light source (hereinafter, referred to as light adjustment) according to an input video signal that varies with time.

Such conventional methods for dynamically adjusting contrast and light source are exemplarily disclosed in Japanese Patent Laid-Open Publication Nos. 5-127608 and 8-201812 titled "liquid crystal display apparatus". In the conventional adjustment methods disclosed in these publications, a maximum brightness level (MAX) and a minimum brightness level (MIN) of an input video signal are detected. When a difference between the maximum brightness level and the minimum brightness level is large, contrast is reduced, and is increased when the difference is small. Further, in the conventional adjustment methods, an average brightness level (APL) of the input video signal is detected. When the average brightness level is higher than a predetermined reference brightness level, brightness of the light source is reduced, and is increased when lower. As such, the conventional adjustment methods aim to always achieve constant display brightness.

In the conventional adjustment methods disclosed in the above publications, however, contrast adjustment (i.e., signal amplitude control) and light source brightness adjustment are separately performed (that means there is no correlation between both adjustments). Accordingly, the above described conventional adjustment methods cannot provide sufficient effect in improvement of a sense of contrast.

The light source is mainly implemented by a fluorescence lamp in view of light-emitting efficiency. General characteristics of the fluorescence lamp are now described by referring to FIG. 27 to FIG. 29. FIG. 27 is a diagram exemplarily showing a characteristic of a general fluorescence lamp, that is, a characteristic of lamp temperature to light emitting-efficiency. FIG. 28 is a diagram exemplarily showing a characteristic of lamp tube current to lamp temperature. Note that FIG. 28 shows a case where the fluorescence lamp is used as a back lamp, and shows a characteristic that the lamp temperature becomes 65° C. at current $i_0$. FIG. 29 is a diagram exemplarily showing a characteristic of lamp tube current to brightness.

First, as shown in FIG. 27, for the general fluorescence lamp in use, there exists a temperature at which its light-emitting efficiency reaches maximum due to vapor pressure of mercury inside the lamp tube (in the drawing, 65° C.). Next, as shown in FIG. 28, the general fluorescence lamp, due to heat produced by itself, shows such a relation that the lamp temperature is in proportion to the lamp tube current. According to the characteristics shown in FIG. 27 and FIG. 28, the efficiency of brightness adjustment (light-emitting efficiency) of the fluorescence lamp is resultantly declined in either case of the lamp tube current being larger or smaller than the current $i_0$, as shown in FIG. 29.

If taking this into consideration, the conventional adjustment methods as disclosed in the above publications are inevitably required to utilize a linear part of the characteristic shown in FIG. 29. This is because the methods aim to achieve constant visual brightness (display brightness) by adjusting the intensity of the light source based on the detected average brightness level. Accordingly, in the conventional adjustment methods, the light source cannot be efficiently used (that is, the maximum brightness cannot be obtained).

Further, the life of the lamp used as the light source varies with lamp tube current and temperature. Therefore, in the conventional image display apparatuses that adjust the intensity of the light source brightness according to a video signal, such a problem has existed that, if the video signal is uneven in its characteristic, a lamp tube current (drive current) of a large value flows in the tube for a long time, thereby shortening the lamp life.

Therefore, a first object of the present invention is to provide an image display apparatus and an image display method capable of visually improving a sense of contrast without increasing power consumption of a light source by carrying out contrast adjustment (signal amplitude control) and brightness adjustment of the light source such that they correlate.

A second object of the present invention is to provide an image display apparatus and an image display method capable of dynamically and optimally adjusting the intensity of the light source according to an input video signal by utilizing a range in the vicinity of a characteristic to maximize the light-emitting efficiency of the light source.

Further, a third object of the present invention is to provide an image display apparatus and an image display method capable of dynamically and optically adjusting the intensity of the light source according to an input video signal while securing the life of the light source required as a product.

SUMMARY OF THE INVENTION

To achieve the objects above, the present invention has the following aspects.

A first aspect of the present invention is directed to an image display apparatus and method for displaying a video signal to be inputted on a passive light modulation part including a light source as an image. In the present image display apparatus and method, an amplitude of the video signal is dynamically adjusted to become a predetermined amplitude value. Then, brightness of the light source is adjusted according to amplitude adjustment so that the image displayed on the passive light modulation part based on the video signal after amplitude adjustment does not vary visually from a predetermined level. As such, according to the present image display apparatus and method, brightness adjustment of the light source is carried out to have correlation between amplitude adjustment, thereby not varying the visual average brightness level. Thereby, a sense of contrast can be visually improved without increasing average power consumption of the light source.

In the present invention, an average brightness level of each frame in the input video signal is preferably used as the predetermined level. In the following second and third aspects, disclosed are image display apparatuses and methods adjusting amplitude and brightness of the light source by using the average brightness level as the predetermined level.

The second aspect of the present invention is directed to an image display apparatus and method for displaying a video signal to be inputted on a passive light modulation part including a light source as an image. In the present image display apparatus and method, a maximum brightness level (MAX), a minimum brightness level (MIN), and an average brightness level (APL) of the video signal are each detected. Then, based on these levels, generated are signal control data indicating an instruction for amplification and light source control data for making the light source light at intensity that an average brightness level of the image displayed on the passive light modulation part based on the video signal after amplification becomes equivalent to the APL. Further, in accordance with the generated signal control data, the maximum amplitude of the video signal (a difference between MAX and MIN) is amplified to a width of a dynamic range for output to the passive light modulation part. In accordance with the generated light source control data, brightness control of the light source is carried out.

Here, the signal control data and the light source control data are preferably generated in the following manner. That is to say, newly received APL is compared with APL of the previous processing so that a level difference therebetween is determined. Then, control data in a range between that calculated in the previous processing and that calculated based on MAX and MIN of this time is adopted in a variable manner according to a variation of the level difference from the minimum value to the maximum value. Alternatively, it is determined whether a level difference between MAX and MIN is smaller than a predetermined value. If determined that the level difference is smaller than the predetermined value, control data in a range between that for a value without amplitude adjustment and light source brightness adjustment and that calculated based on MAX and MIN is adopted in a variable manner according to a variation of the level difference from the minimum value to the predetermined value. Accordingly, in the present image display apparatus and method, a sense of contrast is visually improved approriately even for the video signal varied in type and mode, and in addition, although the effect of improvement in image quality is more or less reduced on each image basis, visual inappropriateness caused by excessive control is suppressed and sequence of images is displayed smoothly.

The third aspect of the present invention is directed to an image display apparatus and method for displaying a video signal to be inputted on a passive light modulation part including a light source as an image. In the present image display apparatus and method, MAX, MIN, and APL of the video signal are each detected. Then, based on these levels, calculated are a gain for amplifying the maximum amplitude of the video signal (a difference between MAX and MIN) to a width of an output dynamic range that is acceptable at the passive light modulation part and an offset indicating an amount for shifting a DC level so that the video signal after amplification falls within the output dynamic range. Further, the video signal is amplified with reference to APL and in accordance with the calculated gain. Still further, the DC level of the video signal after amplification is shifted in accordance with a value of the offset for output to the passive light modulation part. Then, light source brightness control is carried out in accordance with the offset for making the light source light at intensity that an average brightness level of the image displayed on the passive light modulation part based on the video signal after amplification becomes equivalent to APL.

Herein, when the video signal is previously subjected to gamma correction processing, the following process is carried out. That is to say, the video signal to be outputted to the passive light modulation part is subjected to reverse gamma correction processing that compensates the gamma correction processing applied thereto, and outputted to the passive light modulation part. On the other hand, the offset is subjected to the reverse gamma correction processing which is identical to that described above, and used for light source brightness control. Accordingly, in the present image display apparatus and method, a sense of contrast can be visually improved appropriately even with respect to the video signal previously subjected to the gamma correction processing.

As described, in the first to the third aspects, disclosed are the image display apparatuses and methods carrying out contrast adjustment and light source brightness adjustment for the system displaying a single screen. Next, in a fourth aspect, disclosed are an image display apparatus and method carrying out contrast adjustment and light source brightness adjustment for a system displaying two screens on one passive light modulation part.

The fourth aspect of the present invention is directed to an image display apparatus and method displaying two video signals to be inputted at a time on a passive light modulation part including a light source as images. In the present image display apparatus and method, MAX, MIN, and APL of any one of the video signals being a target for adjustment (main video signal) are each detected. Then, based on these levels, generated are signal control data indicating an instruction for amplification and light source control data for making the light source light at intensity that an average brightness level of the image displayed on the passive light modulation part based on the video signal after amplification becomes equivalent to APL. Further, the maximum amplitude of the main video signal (a difference between MAX and MIN) is amplified to a width of a dynamic range in accordance with the generated signal control data. The brightness of the light source is controlled in accordance with the generated light source control data. Still further, an amplitude of any one of the video signals other than the target for adjustment (sub-video signal) is amplified or attenuated according to the light source control data so that the effect of light source brightness adjustment applied to the main video signal is canceled for the sub-video signal. Then, the main video signal after amplification and the sub-video signal after amplification or attenuation is selectively switched in accordance with a timing of a switch signal supplied externally for output to the passive light modulation part. As such, in the present image display apparatus and method, contrast adjustment and light source brightness adjustment are carried out with respect to the main video signal, and correction canceling the effect of the light source brightness adjustment is carried out with respect to the sub-video signal. Thereby, a sense of contrast can be visually improved, appropriately and naturally for both screens in the system displaying two screens at the time.

As described, in the first to the fourth aspects, disclosed are the image display apparatuses and methods visually improving a sense of contrast without increasing power consumption of a light source by carrying out amplitude adjustment and brightness adjustment of the light source to have correlation. Next, in the following fifth to seventh aspects, disclosed are image display apparatuses and methods for dynamically and optimally adjusting the intensity of the light source according to an input video signal by utilizing a range in the vicinity of a characteristic at which the light-emitting efficiency of the light source reaches maximum.

The fifth aspect of the present invention is directed to an image display apparatus and method for displaying a video signal to be inputted on a passive light modulation part including a light source as an image. In the present image display apparatus and method, characteristic data corresponding to a characteristic amount of the video signal is calculated. Then, light adjustment control data for controlling the light source is calculated in accordance with a difference between predetermined reference data and the characteristic data. Further, based on reference light adjustment control data indicating a predetermined drive current at which the light-emitting efficiency of the light source reaches maximum, generated is another light adjustment control data used for controlling a value of the drive current of the light source to converge on the reference light adjustment control data only with respect to components that vary within a predetermined time period among the light adjustment control data. Then, in accordance with the another light adjustment control data, intensity adjustment of the light source is dynamically controlled by controlling the value of the drive current of the light source. As such, in the present image display apparatus and method, the temperature of the light source can always be controlled to be optimum, and therefore, the intensity of the light source can be dynamically adjusted under the condition that the light-emitting efficiency thereof is always maximum. Thereby, the efficiency of light adjustment can be improved more than before.

The another light adjustment control data is generated in the following procedure, for example. First, only AC components that vary within a time period of a predetermined time constant are passed among the light adjustment control data. Herein, the time constant is preferably set not to exceed a time period in which the response characteristic of temperature variation of the light source is unsatisfied with respect to increment/decrement of the drive current of the light source. Then, the reference light adjustment control data and AC component light adjustment control data are added for generation. Accordingly, in the present image display apparatus and method, control can be carried out in such a manner that the light source temperature is always in the range in the vicinity of a characteristic to maximize the light-emitting efficiency (optimum temperature).

Further, preferably in the present image display apparatus and method, a physical amount of a vicinity of the light source may be detected, and according to the detection result, a value of the reference light adjustment control data may be dynamically varied to always maximize the light-emitting efficiency of the light source. Accordingly, in the present image display apparatus and method, brightness can be always adjusted dynamically under the condition to maximize the light-emitting efficiency of the light source, without being affected by the environmental temperature when in use.

A sixth aspect of the present invention is directed to an image display apparatus and method for displaying a video signal to be inputted on a passive light modulation part including a light source as an image. In the present image display apparatus and method, characteristic data corresponding to a characteristic amount of the video signal is calculated. Then, light adjustment control data for controlling the light source is calculated in accordance with a difference between predetermined reference data and the characteristic data. Further, based on reference light adjustment control data indicating a predetermined drive current to maximize the light-emitting efficiency of the light source and/or standard light adjustment control data, generated is another light adjustment control data used for controlling a value of the drive current of the light source to converge on the reference light adjustment control data and/or the standard light adjustment control data only with respect to components that vary within a predetermined time period among the light adjustment control data. Then, in accordance with the another light adjustment control data, intensity adjustment of the light source is dynamically controlled by controlling the value of the drive current of the light source. As such, in the present image display apparatus and method, the temperature of the light source can always be controlled to be optimum, and therefore, the intensity of the light source can be dynamically adjusted under the condition to always maximize the light-emitting efficiency thereof. Thereby, the efficiency of light adjustment can be improved.

Herein, the standard light adjustment control data is preferably the light adjustment control data indicating the drive current set in advance to secure standard brightness or the light adjustment control data indicating an average drive current set in advance to secure a lamp life.

Further, the another light adjustment control data is generated in the following procedure, for example. First, when the light adjustment control data is not less than the standard light adjustment control data, a data difference therebetween is calculated, and when the light adjustment control data is not more than the reference light adjustment control data, a data difference therebetween, and otherwise, a data difference of zero are calculated respectively. Next, only signal components that vary for a time period exceeding a predetermined time constant are extracted from the calculated variation difference data. Herein, the time constant is preferably set not to exceed a time period in which the response characteristic of temperature variation of the light source is unsatisfied with respect to increment/decrement of the drive current of the light source. Then, variation component light adjustment control data is subtracted from the light adjustment control for generation of another light adjustment control data. Accordingly, in the present image display apparatus and method, even for a case that the control reference value is required to be set as more than the drive current at which the light-emitting efficiency of the light source being maximum, intensity adjustment can be dynamically carried out for the brightness variation where the drive current is not less than the standard light adjustment control data while securing the standard brightness. For the brightness variation where the drive current is not more than the reference light adjustment control data, intensity adjustment can be dynamically carried out under the condition to maximize the light-emitting efficiency. Thereby, the efficiency of light adjustment can be improved.

Alternatively, when the light adjustment control data is not less than the standard light adjustment control data, a data difference therebetween is calculated, and otherwise, a data difference of zero is calculated. Next, only signal components that vary for a time period exceeding a predetermined time constant are extracted from the calculated variation difference data. Herein, the time constant is preferably set not to exceed a time period in which the response characteristic of temperature variation of the light source is unsatisfied with respect to increment/decrement of the drive current of the light source. Then, variation component light adjustment control data is subtracted from the light adjustment control for generation of another light adjustment control data. Accordingly, in the present image display apparatus and method, even for a case that the control reference value is required to be set as more than the drive current to maximize the light-emitting efficiency of the light source, intensity adjustment can be dynamically carried out for the brightness variation where the drive current is not less than the standard light adjustment control data while securing the standard brightness. Thereby, the efficiency of light adjustment can be improved.

A seventh aspect of the present invention is directed to an image display apparatus and method for displaying a video signal to be inputted on a passive light modulation part including a light source as an image. In the present image display apparatus and method, MAX, MIN, and APL of the video signal are each detected. Then, based on these levels, generated are signal control data indicating an instruction for amplification and light source control data for making the light source light at intensity that an average brightness level of the image displayed on the passive light modulation part based on the video signal after amplification becomes equivalent to APL. Further, in accordance with the signal control data, the maximum amplitude of the video signal (a difference between MAX and MIN) is amplified to a width of a dynamic range. Further, based on reference light adjustment control data indicating a predetermined drive current to maximize the light-emitting efficiency of the light source, generated is another light source control data used for controlling a value of the drive current of the light source to converge on the reference light adjustment control data only with respect to components that vary within a predetermined time period among the light adjustment control data. Then, light source brightness is dynamically controlled by controlling the value of the drive current of the light source in accordance with the another light source control data. As such, in the present image display apparatus and method, a sense of contrast can be visually improved without increment in average power consumption of the light source by carrying out brightness adjustment of the light source to have correlation with amplitude adjustment, thereby not varying a visual average brightness level. Further, in the present image display apparatus and method, the temperature of the light source can be controlled to always be the optimum temperature. Accordingly, the intensity of the light source can always be adjusted under the condition to always maximize the light-emitting efficiency, and thereby further improving the efficiency of light adjustment.

BRIEF DESCRIPTION OF THE DRAWINGS

FIGS. 7a and 7b are diagrams in assistance of briefly explaining one example of processing carried out, with respect to a certain input signal, by the image display apparatus according to the third embodiment of the present invention.

FIGS. 9a and 9b are diagrams exemplarily showing reverse gamma characteristics in a reverse gamma correction processing part 41 and a gamma control data generation part 45 of FIG. 8.

FIG. 25 is a block diagram showing the structure of an image display apparatus according to an eleventh embodiment of the present invention.

DETAILED DESCRIPTION OF THE INVENTION

FIRST EMBODIMENT

Figure 1:
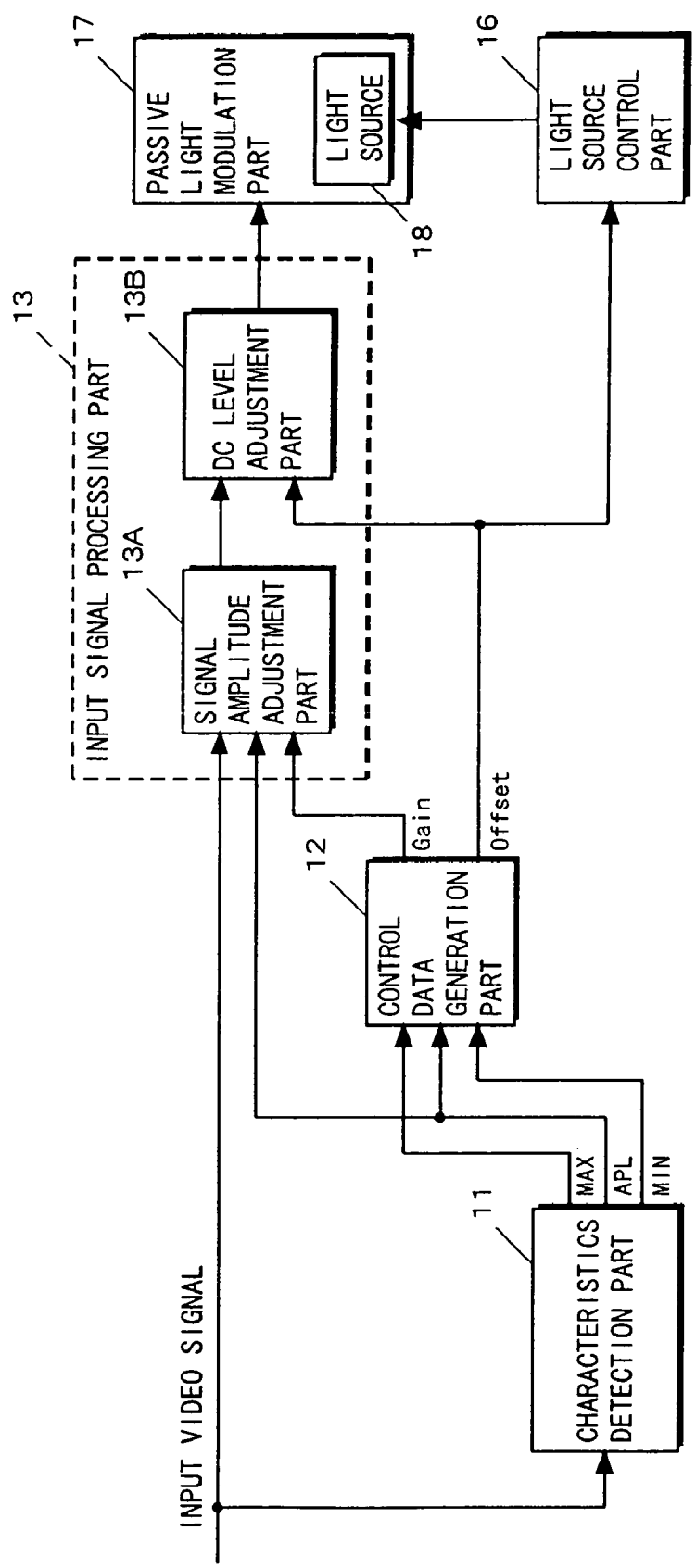
FIG. 1 is a block diagram showing the structure of an image display apparatus according to a first embodiment of the present invention.
Figure 2C:
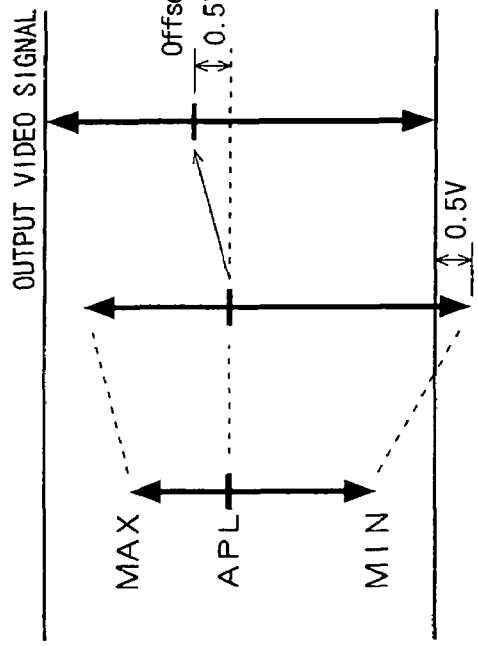
FIGS. 2a-2d are diagrams in assistance of briefly explaining one example of processing carried out, with respect to a certain input signal, by the image display apparatus according to the first embodiment of the present invention.
Figure 2D:
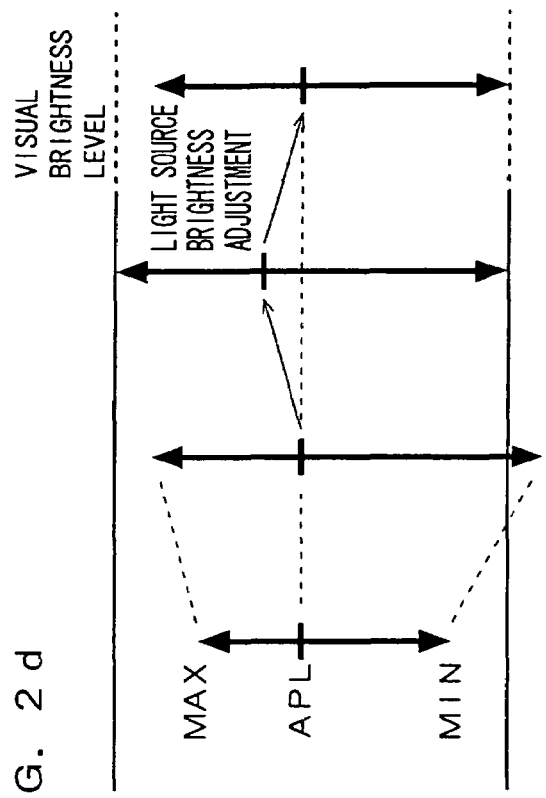
Figure 2A:
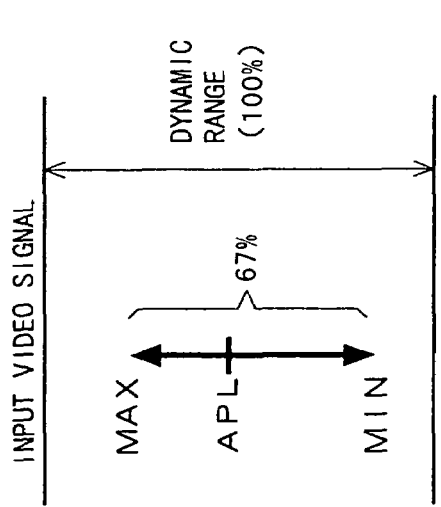
Figure 2B:
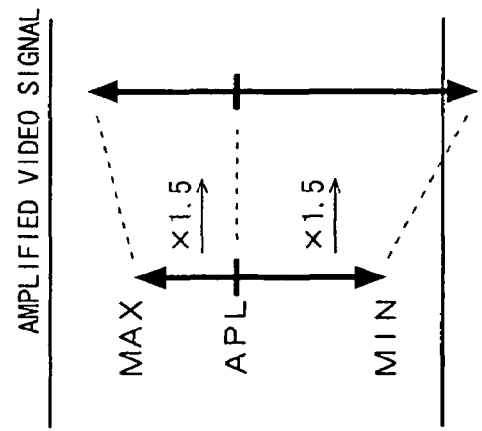
Figure 3C:
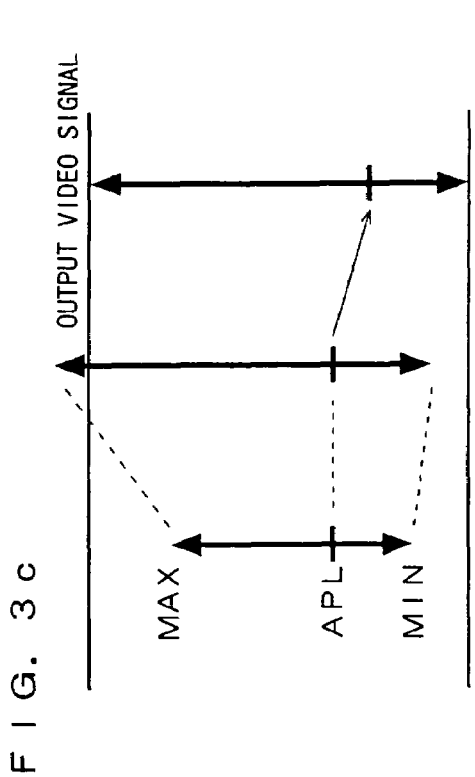
FIGS. 3a-3d are diagrams in assistance of briefly explaining one example of processing carried out, with respect to a certain input signal, by the image display apparatus according to the first embodiment of the present invention.
Figure 3D:
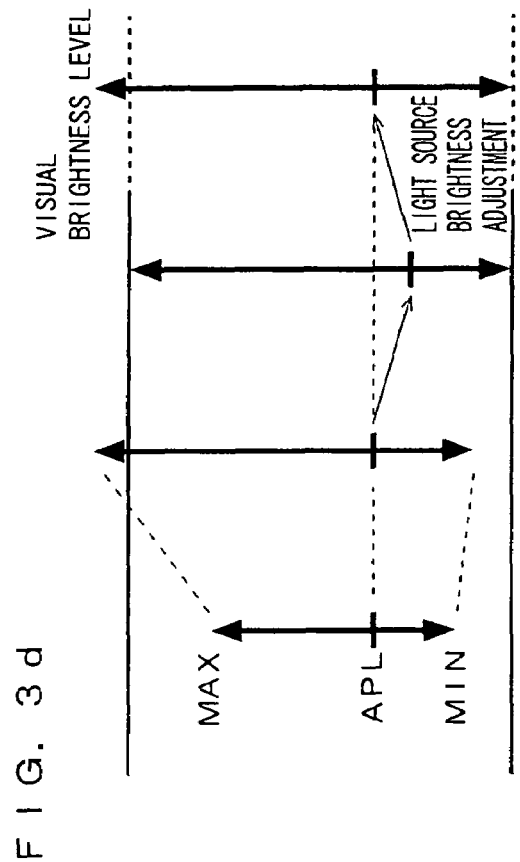
Figure 3A:
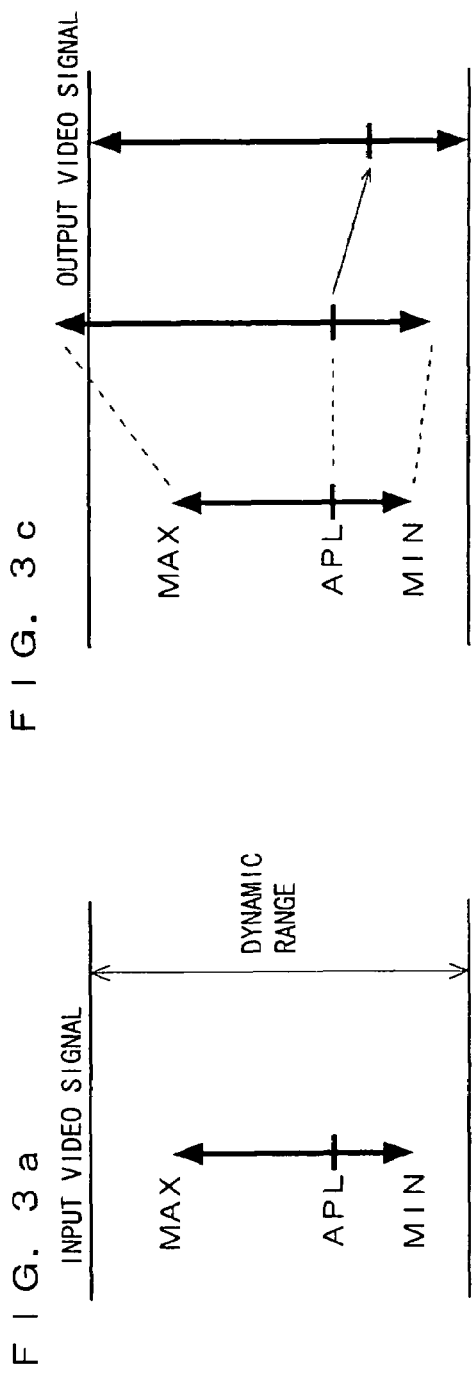
Figure 3B:
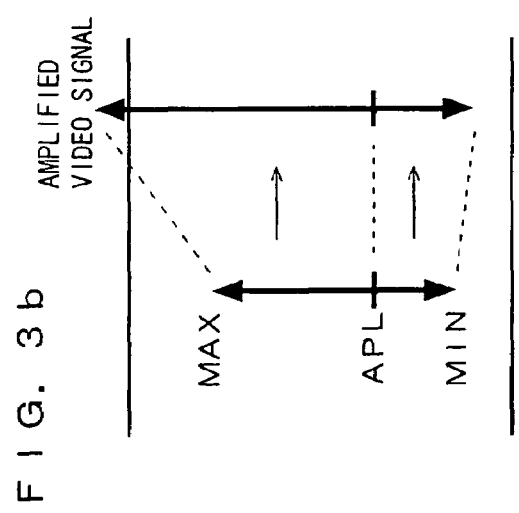

FIG. 1 is a block diagram showing the structure of an image display apparatus according to a first embodiment of the present invention. In FIG. 1, the image display apparatus of the first embodiment includes a characteristics detection part 11, a control data generation part 12, an input signal processing part 13, a light source control part 16, and a passive light modulation part 17. The input signal processing part 13 includes a signal amplitude adjustment part 13A and a DC level adjustment part 13B. The passive light modulation part 17 includes a light source 18.

Hereinafter, by further referring to FIG. 2 and FIG. 3, the operation (image display method) of the image display apparatus according to the first embodiment of the present invention is described for each component. FIG. 2 and FIG. 3 are diagrams each in assistance of briefly explaining one example of the processing carried out, with respect to an input signal, by the image display apparatus according to the first embodiment of the present invention.

First, a video signal which is outputted by a video signal processing circuit (not shown) in a television receiver, computer, or the like, is supplied to the characteristics detection part 11 and the signal amplitude adjustment part 13A of the input signal processing part 13, as an input video signal.

The characteristics detection part 11 detects, with respect to the input video signal, a maximum brightness level (hereinafter, referred to as MAX), a minimum brightness level (hereinafter, referred to as MIN), and an average brightness level (hereinafter, referred to as APL). The detection of MAX, MIN, and APL carried out by the characteristics detection part 11 is a known procedure, and thus the detailed description is not made herein.

The control data generation part 12 receives MAX, MIN, and APL detected by the characteristics detection part 11, and based thereon, calculates a gain for signal amplitude adjustment (hereinafter, referred to as Gain) and a shift amount of DC level of the video signal (hereinafter, referred to as Offset). The calculations are made in the following manner.

Assume herein for a case where the characteristics detection part 11 detects MAX, MIN, and APL as shown in (a) of FIG. 2 or FIG. 3 with respect to the input video signal.

The control data generation part 12 first calculates, according to the following equation, Gain for amplifying the maximum amplitude (difference between MAX and MIN) of the input video signal to a width of the range in which a processing circuit can perform signal processing, i.e., a dynamic range (specifically, an output dynamic range of the DC level adjustment part 13B).

$$\text{Gain} = \text{width of dynamic range}/(\text{MAX}-\text{MIN})$$

For example, when the maximum amplitude of the input video signal is 67% of the dynamic range width as shown in FIG. 2((a) of the drawing), Gain calculated by the control data generation part 12 becomes approximately 1.5 ((b) of the drawing). The calculated Gain is outputted to the signal amplitude adjustment part 13A.

Next, the control data generation part 12 calculates Offset that indicates the shift amount of the DC level so that the input video signal amplified by the signal amplitude adjustment part 13A (hereinafter, referred to as amplified video signal) falls within the dynamic range. Offset is for the signal amplitude adjustment part 13A to carry out amplification with reference to APL (with DC level of APL being fixed), and is also used to change the DC level of the amplified video signal so that the amplitude of the amplified video signal falls within the dynamic range. In FIG. 2, for example, when the amplitude of the amplified video signal exceeds by 0.5V from the lower limit of the dynamic range, Offset calculated by the control data generation part 12 becomes 0.5V ((c) of the drawing). The calculated Offset is outputted to the DC level adjustment part 13B and the light source control part 16.

The signal amplitude adjustment part 13A receives the input video signal, APL outputted by the characteristics detection part 11, and Gain outputted by the control data generation part 12. The signal amplitude adjustment part 13A amplifies the input video signal with reference to APL and in accordance with Gain ((b) of FIG. 2, (b) of FIG. 3). The amplified video signal is outputted to the DC level adjustment part 13B. Here, the output dynamic range of the signal amplitude adjustment part 13A is sufficiently wider compared with that of the DC level adjustment part 13B. Therefore, in (b) of FIG. 2, the part of the signal exceeding the lower limit of the dynamic range is exemplarily indicated as a signal in a minus value.

The DC level adjustment part 13B receives the amplified video signal outputted by the signal amplitude adjustment part 13A and Offset outputted by the control data generation part 12. The DC level adjustment part 13B shifts the DC level of the amplified video signal by the value of Offset ((c) of FIG. 2, (c) of FIG. 3). The amplified video signal after level shift (hereinafter, referred to as output video signal) is outputted to the passive light modulation part 17, and then displayed on a screen as an image.

The light source control part 16 carries out, in accordance with Offset outputted by the control data generation part 12, predetermined brightness adjustment on the light source 18. The brightness adjustment is carried out in such a manner that the visual brightness level of the output video signal becomes equal to the brightness level of the input video signal, that is, APL of the output video signal when displayed as image on the passive light modulation part 17 becomes equal to APL of the input video signal ((d) of FIG. 2, (d) of FIG. 3).

As described, the image display apparatus of the first embodiment accommodates an APL variation generated in the DC level adjustment part 13B through brightness adjustment of the light source 18. Since the visual brightness level decreases as the brightness of the light source 18 is reduced, a sense of contrast is improved as to the black level ((d) of FIG. 2). Further, as to the white level, since the visual white peak increases as the brightness of the light source 18 is increased, the bright portion is more emphasized, leading to visual improvement in a sense of contrast ((d) of FIG. 3).

As described in the foregoing, according to the image display apparatus and method of the first embodiment of the present invention, brightness adjustment of the light source 18 is carried out to have correlation between signal amplitude control performed by the input signal processing part 13, thereby accommodating an APL variation in the output video signal with respect to the input video signal. Accordingly, the image display apparatus and method are capable of visually improving a sense of contrast without increasing average power consumption of the light source 18.

In the first embodiment above, described is the case that the gain for achieving the dynamic range width is assumed as Gain to be calculated by the control data generation part 12. Other than such case, Gain to be calculated by the control data generation part 12 may be a gain for achieving a width narrower than the dynamic range width, where the width is visually most effective in consideration of a noise status and a chrominance gain status of the input video signal.

Further, the process of signal amplification and the process of increasing the brightness of the light source that are described in the first embodiment, at the same time, emphasize noise components of the input video signal. Such processes thus may cause deterioration in image quality. To cope with this, the image display apparatus determines an amount of noise increased through the signal processing in accordance with the values of Gain and Offset generated by the control data generation part 12, and based on the amount of noise, reduces noise components from the input video signal.

Still further, in the image display apparatus of the first embodiment, the passive light modulation part 17 is implemented by a display apparatus, for example, a panel using liquid crystal. The liquid crystal panel, however, has such a characteristic that its response speed becomes faster when the brightness variation (APL variation) of the video signal is large and becomes slower when small. Therefore, when the constant control process is carried out for all types of the brightness variation as described in the first embodiment, in some cases, brightness adjustment of the light source, which conforms to the video, is not appropriately performed. To cope with this, the image display apparatus controls the value of Offset to be generated by the control data generation part 12 appropriately in correspondence with the response speed in the passive light modulation part 17 with respect to the brightness variation (APL variation) of the video signal.

SECOND EMBODIMENT

Figure 4:
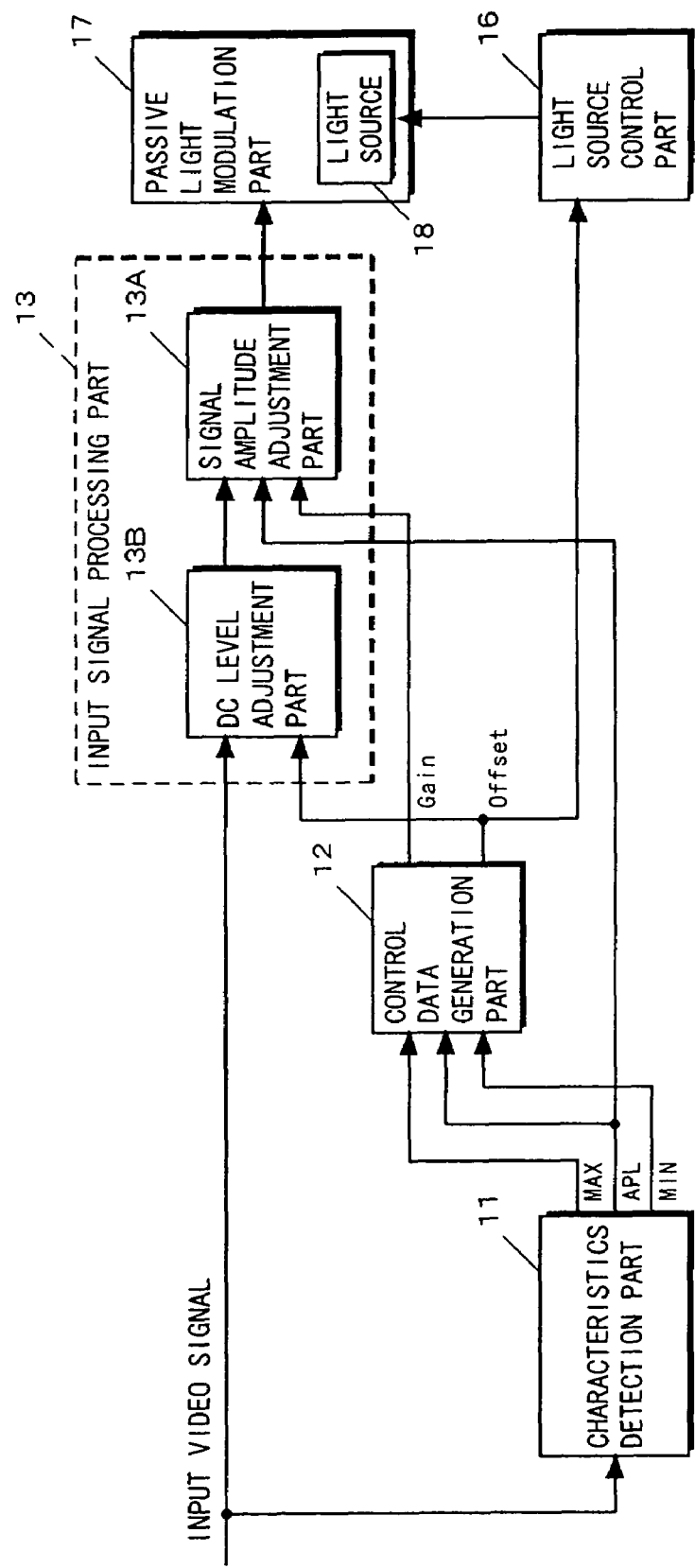
FIG. 4 is a block diagram showing the structure of an image display apparatus according to a second embodiment of the present invention.

FIG. 4 is a block diagram showing the structure of an image display apparatus according to a second embodiment of the present invention. In FIG. 4, the image display apparatus according to the second embodiment includes the characteristics detection part 11, the control data generation part 12, the input signal processing part 13, the light source control part 16, and the passive light modulation part 17. The input signal processing part 13 includes the DC level adjustment part 13B and the signal amplitude adjustment part 13A. The passive light modulation part 17 includes the light source 18.

As shown in FIG. 4, the image display apparatus of the second embodiment is structured so that the signal amplitude adjustment part 13A and the DC level adjustment part 13B of the input signal processing part 13 of the image display apparatus according to the first embodiment are interchanged in procedural order. Note that the components of the image display apparatus of the second embodiment are each identical to those of the first embodiment. The components are thus given the same reference numerals and not described again.

Now, the operation of the image display apparatus according to the second embodiment of the present invention is described focusing on the procedural difference between the image display apparatus according to the first embodiment.

The DC level adjustment part 13B receives an input video signal and Offset outputted by the control data generation part 12. The DC level adjustment part 13B then shifts the DC level of the input video signal by the value of Offset.

The signal amplitude adjustment part 13A receives the input video signal after level shift outputted by the DC level adjustment part 13B, APL outputted by the characteristics detection part 11, and Gain outputted by the control data generation part 12. The signal amplitude adjustment part 13A then amplifies the input video signal after level shift with reference to APL and in accordance with Gain. The amplified video signal (output video signal) is outputted to the passive light modulation part 17 and displayed on a screen as an image.

Consequently, similarly to the first embodiment, an APL variation generated in the DC level adjustment part 13B is accommodated through brightness adjustment of the light source 18. Since the visual brightness level decreases as the brightness of the light source 18 is reduced, a sense of contrast is improved as to the black level ((d) of FIG. 2). Further, as to the white level, since the visual white peak increases as the brightness of the light source 18 is increased, the bright portion is more emphasized, leading to visual improvement in a sense of contrast (see (d) of FIG. 3).

As described in the foregoing, according to the image display apparatus and method of the second embodiment of the present invention, brightness adjustment of the light source 18 is carried out to have correlation between signal amplitude control performed by the input signal processing part 13, thereby accommodating an APL variation in the output video signal with respect to the input video signal. Accordingly, the image display apparatus and method of the second embodiment are capable of visually improving a sense of contrast without increasing average power consumption of the light source 18.

In the second embodiment above, described is the case that the gain for achieving the dynamic range width is assumed as Gain to be calculated by the control data generation part 12. Other than such case, Gain to be calculated by the control data generation part 12 may be a gain for achieving a width narrower than the dynamic range width, where the width is visually most effective in consideration of a noise status and a chrominance gain status of the input video signal.

THIRD EMBODIMENT

In the first and second embodiments, described is the case that contrast adjustment and light source brightness adjustment are carried out for the system displaying a single screen. The contrast adjustment and light source brightness adjustment of the present invention, however, are also adaptable to a system displaying two screens on a passive light modulation part like a personal computer (PC), or the like. Therefore, in a third embodiment of the present invention, described is an image display apparatus capable of visually improving a sense of contrast in a system displaying two screens, through contrast adjustment and light source brightness adjustment.

Figure 5:
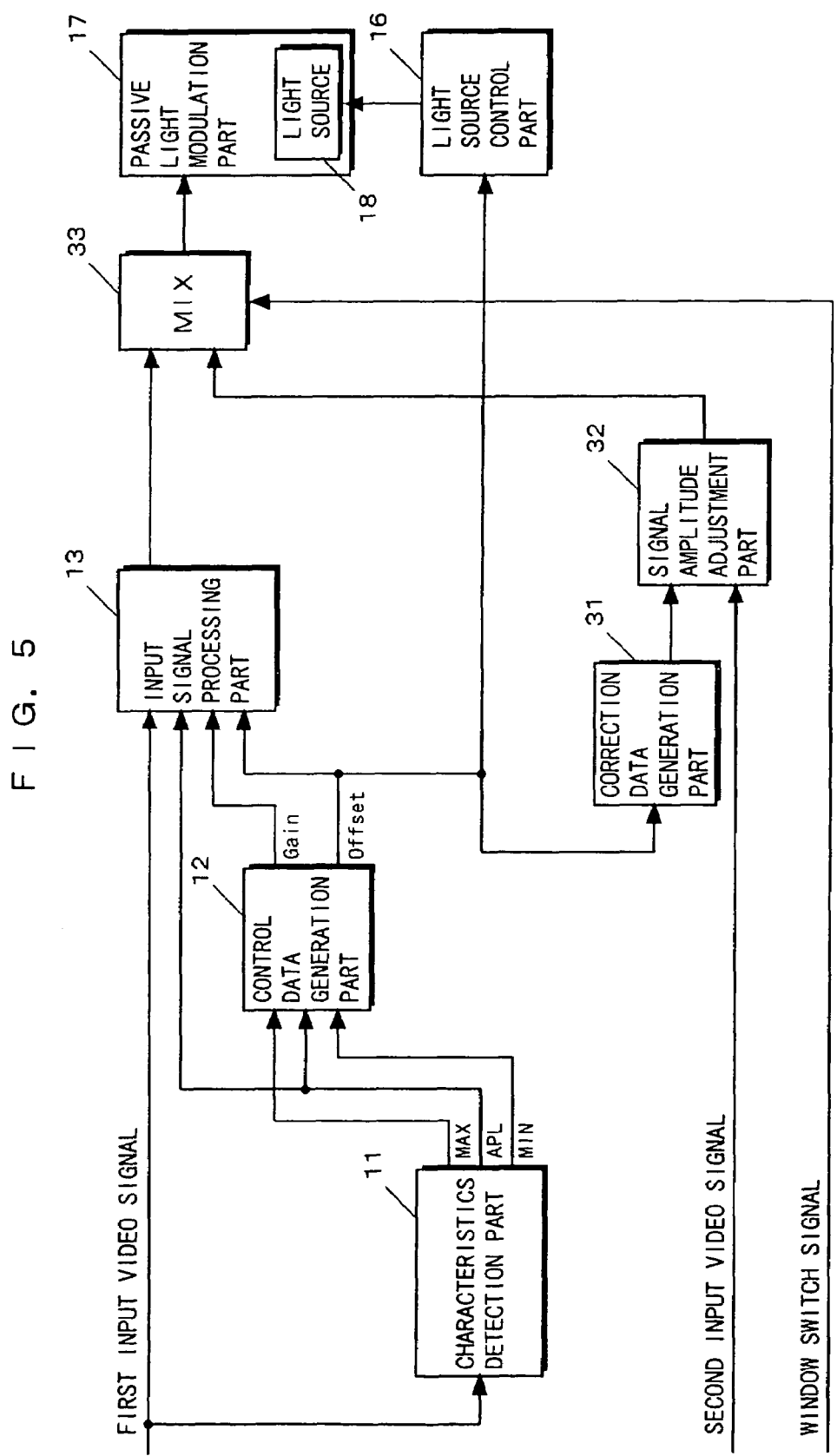
FIG. 5 is a block diagram showing the structure of an image display apparatus according to a third embodiment of the present invention.

FIG. 5 is a block diagram showing the structure of an image display apparatus according to the third embodiment of the present invention. In FIG. 5, the image display apparatus of the third embodiment includes the characteristics detection part 11, the control data generation part 12, the input signal processing part 13, the light source control part 16, a correction data generation part 31, a signal amplitude adjustment part 32, a MIX 33, and the passive light modulation part 17. The passive light modulation part 17 includes the light source 18.

As shown in FIG. 5, the image display apparatus of the third embodiment is provided with the correction data generation part 31, the signal amplitude adjustment part 32, and the MIX 33 in addition to the image display apparatuses of the first and the second embodiments. Other components of the image display apparatus of the third embodiment are identical to those of the first and the second embodiments, and are given the same reference numerals and not described again.

Figure 6:
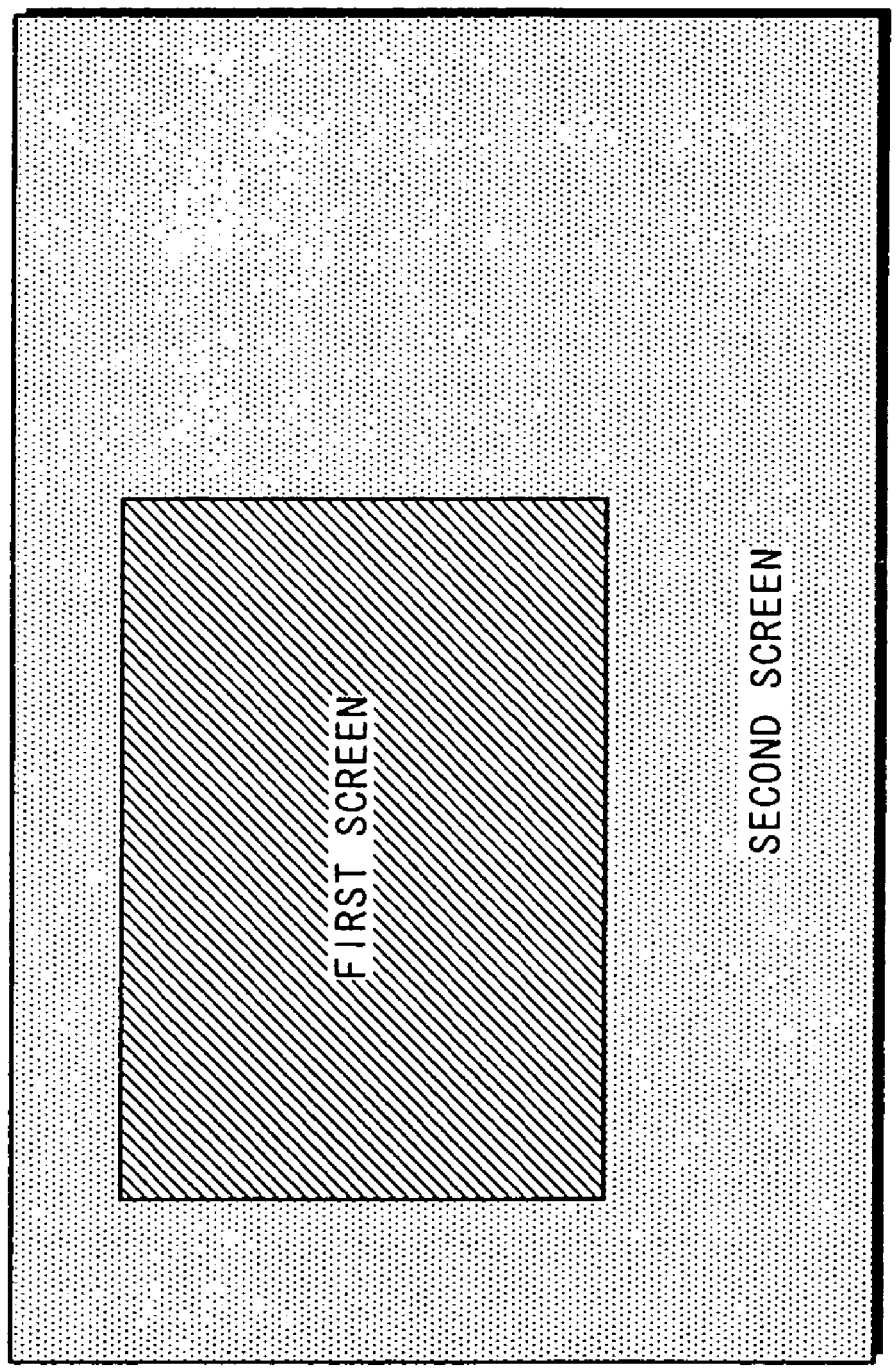
FIG. 6 is a diagram showing one example of displaying two screens on a passive light modulation part 17 of FIG. 5.

Now, by further referring to FIG. 6 and FIG. 7, the image display apparatus according to the third embodiment of the present invention is described focusing on the components that differ from the image display apparatuses according to the first and the second embodiments. FIG. 6 is a diagram exemplarily showing the passive light modulation part 17 of FIG. 5 displaying two screens thereon. FIGS. 7a and 7b are diagrams in assistance of schematically explaining an example of a procedure carried out by the image display apparatus of the third embodiment with respect to an input video signal.

Assume that two screens (windows) as shown in FIG. 6 are displayed on the photo-receptive optical modulator 17 and the image display apparatus performs contrast adjustment and light source brightness adjustment on a first screen. Here, a video signal processing circuit (not shown) in a television receiver, a computer, or the like, outputs a first input video signal for displaying the first screen (target screen for control) to the characteristics detection part 11 and the input signal processing part 13, and outputs a second input video signal for displaying a second screen (non-target screen for control) to the signal amplitude adjustment part 32. The video signal processing circuit also outputs, to the MIX 33, a window switch signal indicating either one of the output video signals relating to either screen.

First, with respect to the first input video signal, the characteristics detection part 11, the control data generation part 12, the input signal processing part 13, and the light source control part 16 carry out the processing described in the first and the second embodiments to adjust contrast and light source brightness (FIG. 7(a)).

The correction data generation part 31 receives Offset outputted by the control data generation part 12. Based on Offset, the correction data generation part 31 generates a signal for correcting the amplitude of the second input video signal so as to avoid the second input video signal being affected by light source adjustment carried out for the first input video signal (that is, to cancel the effect of light source brightness adjustment).

The signal amplitude adjustment part 32 receives the correction signal outputted by the correction data generation part 31 and the second input video signal, and based on the correction signal, amplifies or attenuates the amplitude of the second input video signal. Here, the signal amplitude adjustment part 32 amplifies or attenuates the second input video signal with reference to the black level (FIG. 7(b)).

The MIX 33 receives the contrast-adjusted first input video signal outputted by the input signal processing part 13 and the contrast-corrected second input video signal outputted by the signal amplitude adjustment part 32 and switches therebetween in accordance with a timing indicated by the window switch signal to output the output video signal to the passive light modulation part 17.

With the procedure above, the image display apparatus of the third embodiment is capable of correcting the amplitude of the second input video signal in such a manner that the brightness adjustment of the light source 18 carried out for the first input video signal is always canceled (FIG. 7(b)). As a result, the second screen is not affected by contrast adjustment and light source brightness adjustment carried out for the first screen.

As described in the foregoing, in the image display apparatus and method of the third embodiment of the present invention, contrast adjustment and light source brightness adjustment are carried out with respect to a target screen for control, and correction is carried out with respect to a non-target screen for control in such a manner that the effect of the light source brightness adjustment is canceled. Accordingly, even in the system displaying two screens, the image display apparatus and method of the third embodiment are capable of visually improving a sense of contrast appropriately and naturally for both screens.

In the third embodiment above, the black level is presumably adopted as the reference for the signal amplitude adjustment part 32 to amplify or attenuate the second input video signal. Such reference, however, is not limited to the black level and may be the APL level or any arbitrary level which can be obtained through characteristic detection (similar to that by the character detection part 11) of the second input video signal.

FOURTH EMBODIMENT

On assumption that a CRT is used as a display apparatus, an input video signal is generally subjected to gamma correction processing in advance to correct gamma characteristic of the CRT. On the other hand, the passive light modulation part 17 serving as the display apparatus in the present invention (e.g., liquid crystal panel) does not have such gamma characteristic as does the CRT. Accordingly, there may be some cases that an image is not appropriately displayed on the image display apparatus if an input video signal previously subjected to gamma correction processing is merely subjected to contrast adjustment and light source brightness adjustment described in the first and the second embodiments. Therefore, in a fourth embodiment of the present invention, described is an image display apparatus appropriately adjusting contrast and light source brightness by applying reverse gamma correction processing to an input video signal previously subjected to gamma correction processing.

Figure 8:
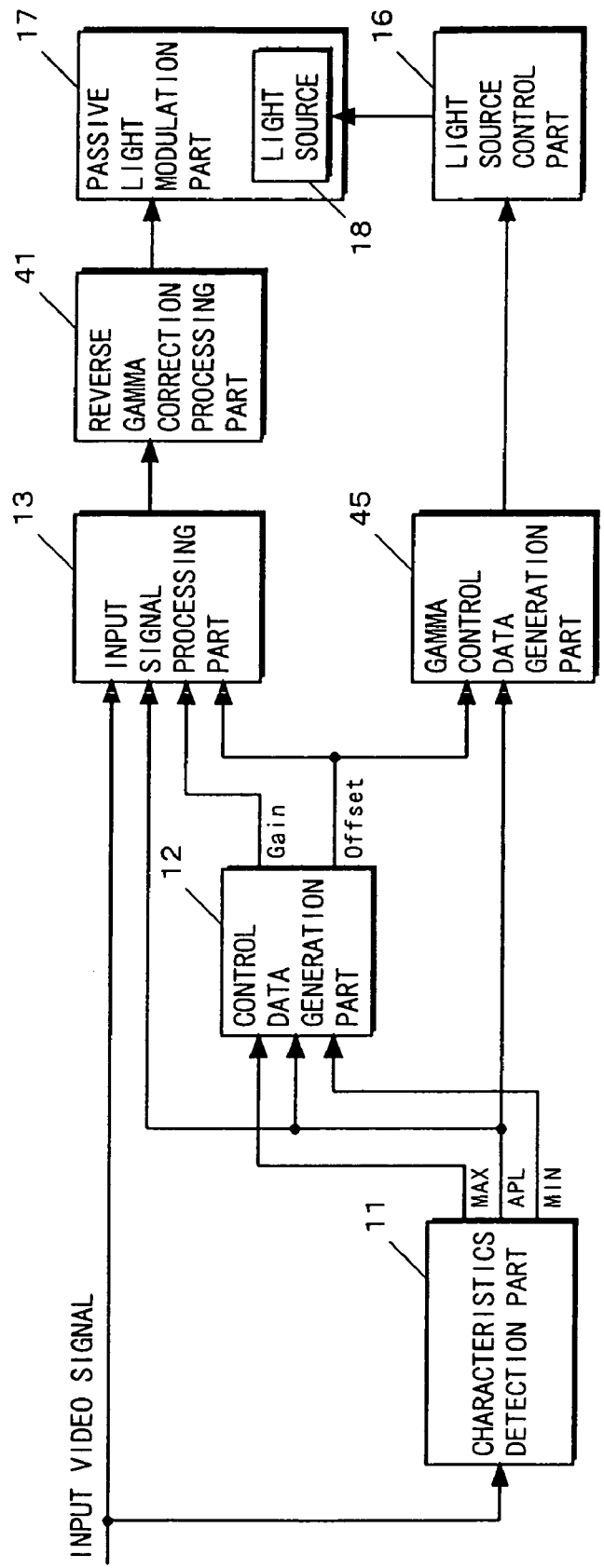
FIG. 8 is a block diagram showing the structure of an image display apparatus according to a fourth embodiment of the present invention.

FIG. 8 is a block diagram showing the structure of an image display apparatus according to the fourth embodiment of the present invention. In FIG. 8, the image display apparatus of the fourth embodiment includes the characteristics detection part 11, the control data generation part 12, the input signal processing part 13, a reverse gamma correction processing part 41, a gamma control data generation part 45, the light source control part 16, and the passive light modulation part 17. The passive light modulation part 17 includes the light source 18.

As shown in FIG. 8, the image display apparatus of the fourth embodiment is provided with the reverse gamma correction processing part 41 and the gamma control data generation part 45 in addition to the image display apparatuses of the first and the second embodiments. Other components of the image display apparatus of the fourth embodiment are identical to those of the first and the second embodiments, and are thus given the same reference numerals and not described again.

Now, by further referring to FIGS. 9(a) and 9(b), the image display apparatus according to the fourth embodiment of the present invention is described focusing on the components that differ from the image display apparatuses of the first and the second embodiments. FIGS. 9(a) and 9(b) are diagrams exemplarily showing reverse gamma characteristics in the reverse gamma correction processing part 41 and the gamma control data generation part 45 of FIG. 8.

The reverse gamma correction processing part 41 receives, from the input signal processing part 13, a non linear output video signal previously subjected to gamma correction processing, and based on the predetermined reverse gamma characteristic shown in FIG. 9(a), applies reverse gamma correction processing to the output video signal. The reverse gamma characteristic herein is of a characteristic completely reverse to the gamma characteristic previously given to the input video signal (i.e., compensating the gamma characteristic). For example, gamma=2.2 for the NTSC standard. As a result of the procedure, a linear output video signal is outputted from the reverse gamma correction processing part 41 to the passive light modulation part 17.

The gamma control data generation part 45 receives APL outputted by the characteristics detection part 11 and Offset outputted by the control data generation part 12. Based on the predetermined reverse gamma characteristic shown in FIG. 9(b), the gamma control data generation part 45 determines a difference β indicating Offset after reverse gamma correction processing from a difference α between Offset and APL. The difference β is outputted to the light source control part 16. The reverse gamma characteristic in the gamma control data generation part 45 is identical to that in the reverse gamma correction processing part 41.

As described in the foregoing, according to the image display apparatus and method of the fourth embodiment of the present invention, light source brightness adjustment is carried out to have correlation with signal amplitude control, thereby accommodating an APL variation in the output video signal with respect to the input video signal, and in such procedure, for appropriate contrast adjustment and light source brightness adjustment, reverse gamma correction processing is performed to compensate gamma correction processing previously applied to the input video signal. Accordingly, even with respect to the input video signal previously subjected to gamma correction processing, the image display apparatus and method of the fourth embodiment are capable of visually improving a sense of contrast.

In the fourth embodiment, described is the case that the components of the reverse gamma correction processing part 41 and the gamma control data generation part 45 are applied to the image display apparatuses of the first and the second embodiments. It is also possible, however, to achieve the same effects by applying such components to the image display apparatus of the third embodiment.

Further, in the fourth embodiment, the image display apparatus performs reverse gamma correction processing after contrast adjustment and light source brightness adjustment. The above described useful effects, however, can also be achieved with an image display apparatus that is structured so as to first apply reverse gamma correction processing to an input video signal previously subjected to gamma correction processing, and then appropriately adjust contrast and light source brightness.

FIFTH EMBODIMENT

The input video signal is varied in type and mode. Accordingly, there may be some cases where an image is not appropriately displayed on the image display apparatus if the input video signal is unconditionally subjected to contrast adjustment and light source brightness adjustment in a manner described in the first and second embodiments. Therefore, in a fifth embodiment of the present invention, described is an image display apparatus appropriately adjusting contrast and light source brightness for an input video signal varied in type and mode.

Figure 10:
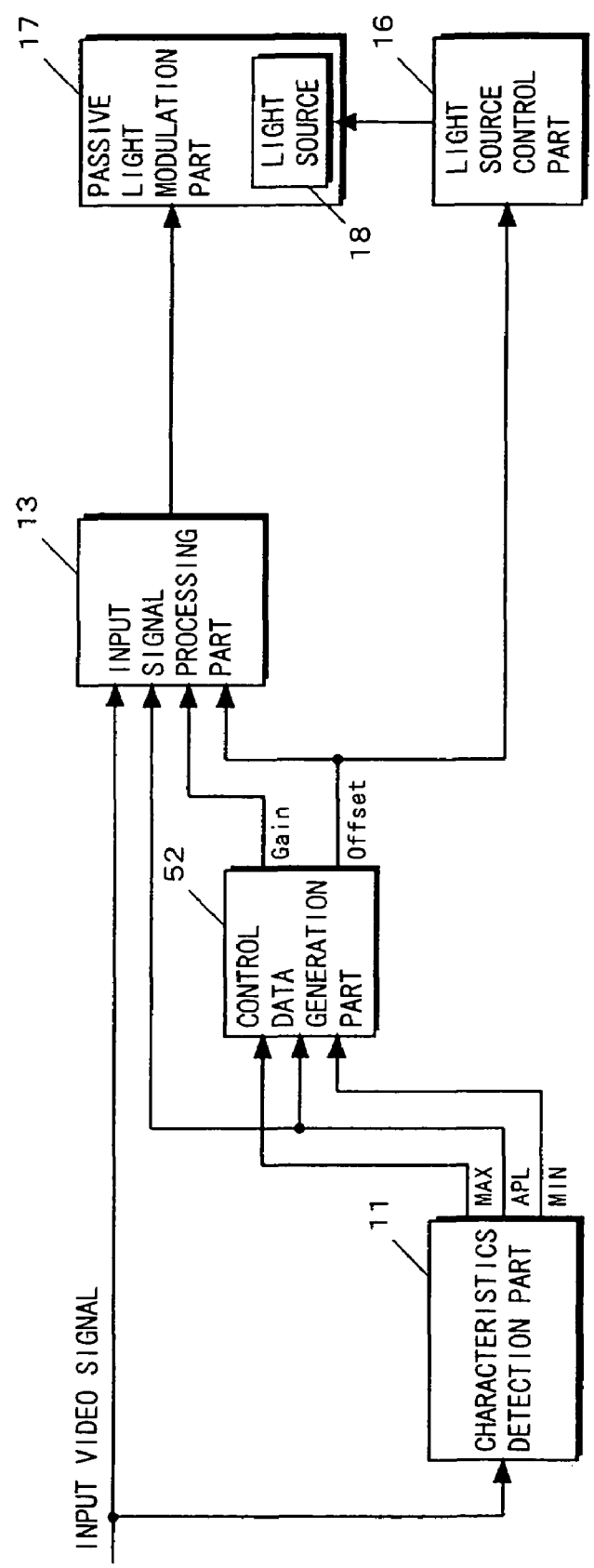
FIG. 10 is a block diagram showing the structure of an image display apparatus according to a fifth embodiment of the present invention.

FIG. 10 is a block diagram showing the structure of an image display apparatus according to the fifth embodiment of the present invention. In FIG. 10, the image display apparatus of the fifth embodiment includes the characteristics detection part 11, a control data generation part 52, the input signal processing part 13, the light source control part 16, and the passive light modulation part 17. The passive light modulation part 17 includes the light source 18.

As shown in FIG. 10, the image display apparatus of the fifth embodiment is provided with the control data generation part 52 in place of the control data generation part 12 of the image display apparatuses of the first and the second embodiments. Other components of the image display apparatus of the fifth embodiment are identical to those of the first and the second embodiments, and are thus given the same reference numerals and not described again.

Now, for the cases in which the input video signal is classified by types and modes, the image display apparatus of the fifth embodiment of the present invention is described focusing on the component that differs from the image display apparatuses according to the first and the second embodiments.

(1) In Case of Blue Back Signal or Signal at Mode Transition

The case where an input video signal is a special signal such as a blue back signal for an all-blue screen or a signal for an all-white screen used at a mode transition like screen switching (e.g., fade in/fade out) is described. Such a special signal does not need to be improved in image quality and is preferably displayed as it has been originally inputted on the image display apparatus without contrast adjustment and light source brightness adjustment. Accordingly, the image display apparatus of the fifth embodiment carries out the following processing in the control data generation part 52.

The control data generation part 52 receives MAX, MIN, and APL detected by the characteristics detection part 11, and determines whether a level difference between MAX and MIN is larger or smaller than a predetermined value (hereinafter, referred to as TH_LVL). This is based on the fact that the level difference between MAX and MIN is relatively small in a signal such as blue back signal.

If determined that the level difference is larger than TH_LVL, the control data generation part 52 calculates and outputs Gain and Offset which correspond to the input video signal, as described in the first and the second embodiments. On the other hand, if determined that the level difference is smaller than TH_LVL, the control data generation part 52 determines that the input video signal is the special signal such as blue back signal. Gain and Offset to be outputted thereby are less in control effects than the above Gain and Offset calculated. Specifically, when Gain and Offset without any adjustment are represented as Gain_Typ and Offset_Typ, respectively, and Gain and Offset to be outputted are represented as Gain_Out and Offset_Out, respectively, Gain_Out and Offset_Out are calculated in accordance with the following equations:

$$\mathrm{Gain\_Out} = \mathrm{Gain\_\mathit{Typ}} + (\mathrm{Gain} - \mathrm{Gain\_\mathit{Typ}}) \ast ((\mathrm{MAX} - \mathrm{MIN})/\mathit{TH\_LVL})$$

$$\mathrm{Offset\_Out} = \mathrm{Offset\_\mathit{Typ}} + (\mathrm{Offset} - \mathrm{Offset\_\mathit{Typ}}) \ast ((\mathrm{MAX} - \mathrm{MIN})/\mathit{TH\_LVL})$$

With this procedure, the image display apparatus of the fifth embodiment is capable of preventing excessive correction caused by unnecessary control and reducing power consumption. Note that the predetermined value described above may be set at will in accordance with the level of the input special signal.

In the above explanation, as the processing carried out by the control data generation part 52, described is a method of discriminating the special signal when the level difference between MAX and MIN is smaller than the predetermined value, and gradually bringing Gain near to 1 in accordance with (MAX−MIN) Alternatively, it is also possible to adopt a method of discriminating the special signal based on color, synchronization (e.g., not being interlace signal), or the like, as the processing carried out by the control data generation part 52.

(2) In Case of Signal Having Variation Only in Very Small Region

The case where an input video signal is a signal having variation in a part of the entire screen, that is, a signal with no variation in most of the video but varied in a very small part region is described. When the image display apparatus adjusts contrast and light source brightness under the influence of the varied region of such signal, a large region without variation, which forms most of the image, looks unnatural in some cases. Therefore, for such signal, adjustment values in the image display apparatus are preferably not changed largely from those of the previous processing, in order to keep small the variation from the output image of the previous time to that of this time. Accordingly, the image display apparatus of the fifth embodiment carries out the following processing in the control data generation part 52.

Here, as a precondition, the control data generation part 52 holds MAX, MIN, APL, Gain, and Offset of the previous processing. The control data generation part 52 receives MAX, MIN, and APL detected by the characteristics detection part 11 and compares such newly received APL with the previous APL held therein to calculate a level variation therebetween (level difference). This is based on the fact that the signal having variation in very small region mostly shows no variation of APL.

When no level difference is observed, the control data generation part 52 outputs Gain and Offset of the previous processing as Gain and Offset corresponding to the input video signal. On the other hand, when any level difference is observed, the control data generation part 52 outputs, as Gain and Offset corresponding to the input video signal, Gain and Offset determined depending on the magnitude of the level difference in a variable manner within a range between Gain and Offset of the previous processing and Gain and Offset calculated based on MAX, MIN, and APL of this time. Such variations of Gain and Offset can be achieved by providing a low-pass filter (LPF) of a cyclic type that passes Gain and Offset. When the level difference is small, a time constant of the LPF is increased (reduce amount of variation), and when the level difference is large, the time constant of the LPF is decreased (increase amount of variation).

Note, when the level difference is large, the control data generation part 52 may control Gain and Offset to be outputted in correspondence with the input video signal to finally converge on Gain and Offset calculated based on MAX, MIN, and APL of this time, or on Gain and Offset separately predetermined.

With this procedure, although the effect of improvement in image quality is more or less reduced on each image basis, the image display apparatus of the fifth embodiment is capable of suppressing visual inappropriateness caused by excessive control, and thus smoothly displaying sequence of images. The amount variable in accordance with the level difference may be set at will in correspondence with an amplitude level of the input video signal. Further, although the control data generation part 52 determines whether or not the video signal has variation in only very small region based on APL variation, determination can be made using MAX variation or MIN variation. Still further, when the control data generation part 52 determines that the image is not varied in most part, the accuracy of such determination can be improved by adopting a technique of detecting histogram data. Moreover, the characteristics detection part 11 may divide the screen into a plurality of regions, and for each region, detect MAX, MIN, and APL. Thereafter, based on the detected values, the control data generation part 52 may determine whether or not the variation is observed, thereby improving the accuracy of determination.

(3) In Case of Signal Having Large Variation

The case where an input video signal is a signal having large variation due to screen changeover etc. is described. Note herein that the input video signal varies a bit on the time axis (due to noise, or the like) even if the image does not change at all. If the image display apparatus changes the adjustment level each time of such small variation, the image is not comfortably seen due to flicker. To secure visibility of image, the image display apparatus is generally provided with a low-pass filter (LPF) in the control data generation part 52 so as to accommodate the small variations (smoothening) before adjusting contrast and light source brightness. However, if the input video signal having large variation is also passed through the LPF and smoothened, the adjustments following thereafter are not actually corresponding to the video signal. Therefore, for such signal having large variation, the image display apparatus preferably carries out each adjustment without passing the signal through the LPF. Accordingly, the image display apparatus of the fifth embodiment carries out the following processing in the control data generation part 52.

Here, as a precondition, the control data generation part 52 holds MAX, MIN, and APL of the previous processing. The control data generation part 52 receives MAX, MIN, and APL detected by the characteristics detection part 11 and compares the newly received APL with the previous APL held therein to calculate a level variation (level difference). This is based on the fact that the signal having large variation mostly shows variation of APL.

When determining that the level difference is smaller than a predetermined value, the control data generation part 52 calculates and outputs Gain and Offset corresponding to the input video signal by using MAX, MIN, and APL after passing through the LPF. On the other hand, when determining that the level difference is larger than the predetermined value, the control data generation part 52 calculates and outputs Gain and Offset corresponding to the input video signal by using MAX, MIN, and APL before passing through the LPF.

With this procedure, the image display apparatus of the fifth embodiment is capable of carrying out adjustments which are actually corresponding to the input video signal, thereby emphasizing the variation in the input video signal. The predetermined value described above may be set at will in accordance with amplitude level of the input video signal. Further, although the control data generation part 52 determines whether or not the video signal has large variation based on APL variation, the determination can be made using MAX variation or MIN variation. Still further, when determining that the level difference is larger than the predetermined value, the control data generation part 52 may change the characteristics of the LPF appropriately, and then calculate and output Gain and Offset corresponding to the input video signal by using MAX, MIN, and APL after passing through the LPF.

As described in the foregoing, according to the image display apparatus and method of the fifth embodiment of the present invention, light source brightness adjustment is carried out to have correlation between signal amplitude control, thereby accommodating an APL variation in the output video signal with respect to the input video signal, and in such procedure, appropriate adjustments are determined based on the type and mode of the input video signal. Accordingly, the image display apparatus and method of the fifth embodiment are capable of visually improving a sense of contrast appropriately even for an input video signal varied in type and mode.

In the fifth embodiment, described is the case that the component of the control data generation part 52 is applied to the image display apparatuses of the first and the second embodiments. It is also possible, however, to achieve the same effects by applying such component to the image display apparatuses of the third and the fourth embodiments. Further, the control data generation part 52 in the fifth embodiment is not necessarily the component supporting all signals (1) to (3) described above, but may support any one or two signals thereamong.

SIXTH EMBODIMENT

In the first to the fifth embodiments above, the characteristics detection part 11 detects APL for use in contrast adjustment and light source brightness adjustment. Accordingly, there still exists a problem that the characteristics detection part 11 is complex in structure. Therefore, in a sixth embodiment of the present invention, an image display apparatus adjusting contrast and light source brightness without using APL is described.

Figure 11:
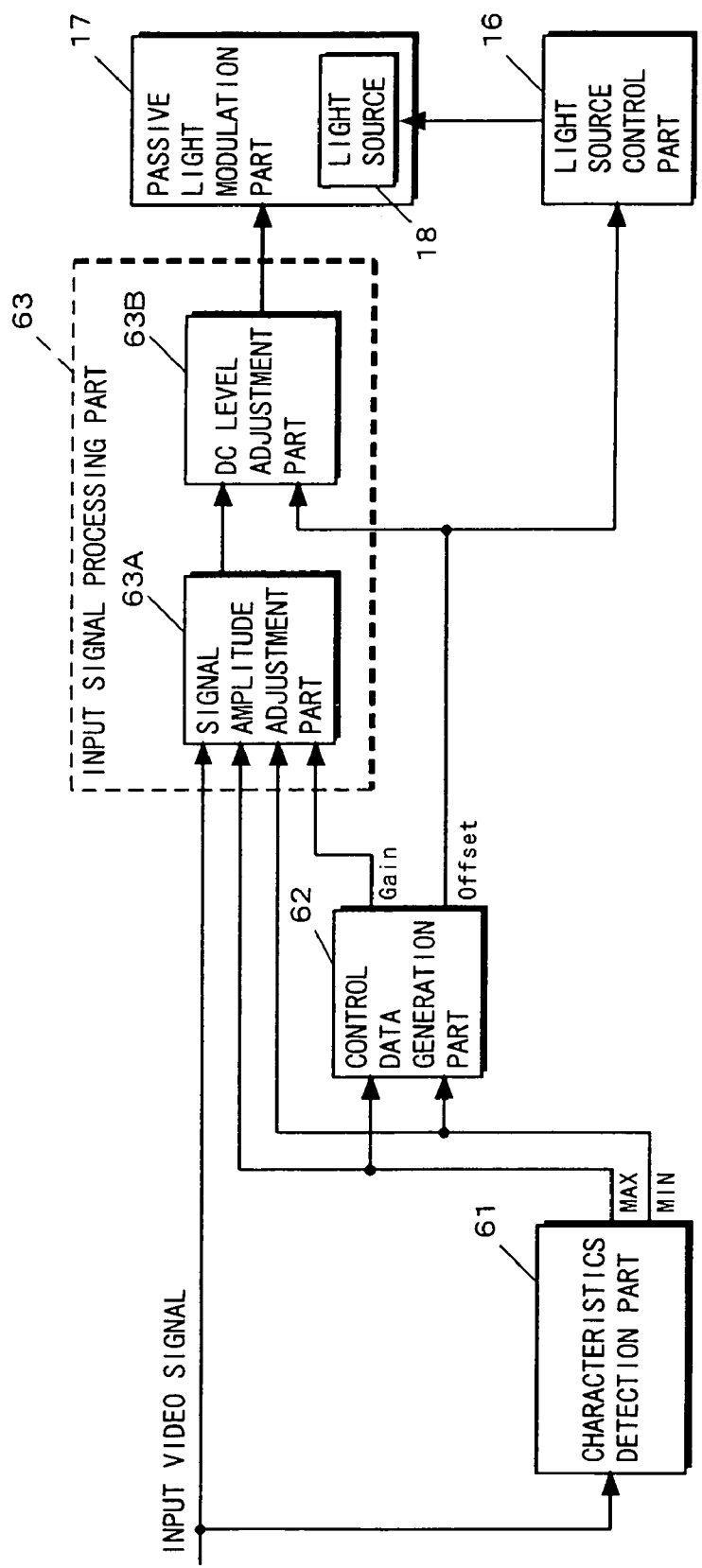
FIG. 11 a block diagram showing the structure of an image display apparatus according to a sixth embodiment of the present invention.

FIG. 11 is a block diagram showing the structure of an image display apparatus according to the sixth embodiment of the present invention. In FIG. 11, the image display apparatus of the sixth embodiment includes a characteristics detection part 61, a control data generation part 62, an input signal processing part 63, the light source control part 16, and the passive light modulation part 17. The input signal processing part 63 includes a signal amplitude adjustment part 63A and a DC level adjustment part 63B. The passive light modulation part 17 includes the light source 18.

As shown in FIG. 11, the image display apparatus of the sixth embodiment is provided with the characteristics detection part 61, the control data generation part 62, and the input signal processing part 63 in place of the characteristics detection part 11, the control data generation part 12, and the input signal processing part 13 of the image display apparatus of the first embodiment. Other components of the image display apparatus according to the sixth embodiment are identical to those of the first embodiment, and are thus given the same reference numerals and not described again.

Now, the image display apparatus of the sixth embodiment of the present invention is described focusing on the components that differ from the image display apparatus of the first embodiment.

First, a video signal which is outputted by a video signal processing circuit (not shown) in a television receiver, computer, or the like, is supplied to the characteristics detection part 61 and the input signal processing part 63, as an input video signal. The characteristics detection part 61 detects MAX and MIN of the input video signal.

The control data generation part 62 receives MAX and MIN detected by the characteristics detection part 61, and based on these levels, calculates Gain and Offset in the following manner.

The control data generation part 62 first calculates, according to the following equation, Gain for amplifying the maximum amplitude (difference between MAX and MIN) of the input video signal to a width of the range in which the processing circuit can perform signal processing, i.e., a dynamic range (specifically, an output dynamic range of the DC level adjustment part 63B).

Gain=width of dynamic range/(MAX−MIN)

The calculated Gain is outputted to the signal amplitude adjustment part 63A.

Next, based on MAX and MIN, the control data generation part 62 calculates an average value of MAX and MIN of the input video signal [=(MAX+MIN)/2]. The control data generation part 62 then calculates Offset indicating the DC level that brings the input video signal, which is amplified by the signal amplitude adjustment part 63A with reference to the average value, within the output dynamic range. Offset is used to change the DC level of the amplified video signal so that the amplitude of the amplified video signal falls within the dynamic range. The calculated Offset is outputted to the DC level adjustment part 63B.

The signal amplitude adjustment part 63A receives the input video signal, MAX and MIN outputted by the characteristics detection part 61, and Gain outputted by the control data generation part 62. The signal amplitude adjustment part 63A amplifies the input video signal with reference to the average value and in accordance with Gain. The amplified video signal is outputted to the DC level adjustment part 63B.

The DC level adjustment part 63B receives the amplified video signal outputted by the signal amplitude adjustment part 63A and Offset outputted by the control data generation part 62. The DC level adjustment part 63B shifts the DC level of the amplified video signal in accordance with Offset. The amplified video signal after level shift (output video signal) is outputted to the passive light modulation part 17, and then displayed on a screen as an image.

The light source control part 16 carries out, in accordance with Offset, the predetermined brightness adjustment on the light source 18. The brightness adjustment is carried out in such a manner that the visual brightness level of the output video signal becomes equal to the brightness level of the input video signal, that is to say, an average value of output video signal when displayed as image on the passive light modulation part 17 becomes equal to the average value of the input video signal.

As described in the foregoing, according to the image display apparatus and method of the sixth embodiment of the present invention, brightness adjustment of the light source 18 is carried out to have correlation between signal amplitude control performed by the input signal processing part 63, thereby accommodating an average value variation in the output video signal with respect to the input video signal. Accordingly, the image display apparatus and method of the sixth embodiment are capable of visually improving a sense of contrast without increasing average power consumption of the light source 18. Further, in the image display apparatus of the sixth embodiment, the characteristics detection part 61 can be simplified in structure.

In the sixth embodiment, described is the case that the components of the characteristics detection part 61, the control data generation part 62, and the input signal processing part 63 are applied to the image display apparatus of the first embodiment. It is also possible, however, to achieve the same effects by applying such components to the image display apparatuses of the second to the fifth embodiments. Further, in the image display apparatus of the sixth embodiment, the same effect can be achieved even if the signal amplitude adjustment part 63A and the DC level adjustment part 63B of the input signal processing part 63 are interchanged in structural order as described in the second embodiment.

SEVENTH EMBODIMENT

Next, in a seventh embodiment, described is an image display apparatus adjusting contrast and light source brightness without using the average value of MAX and MIN of an input video signal, but with a brightness level appearing most frequently in each field.

Figure 12:
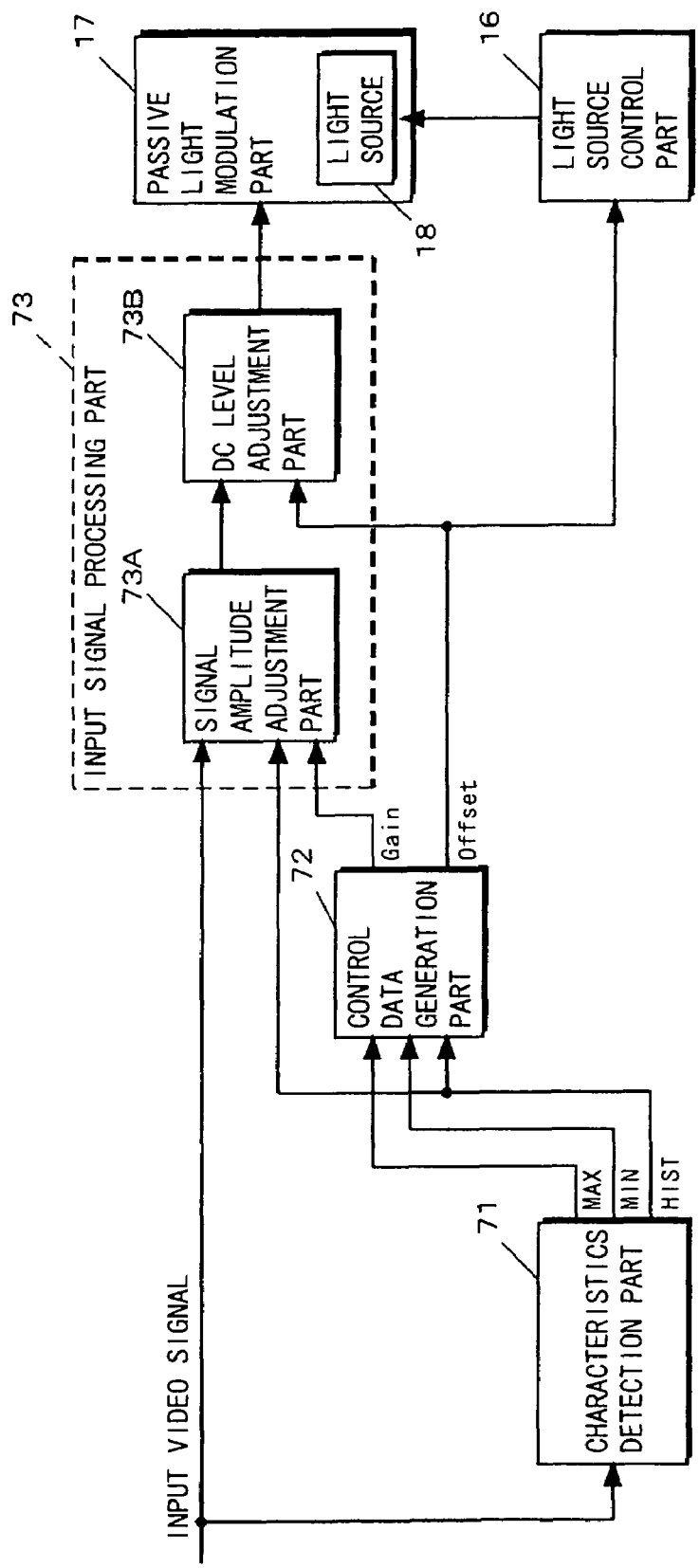
FIG. 12 is a block diagram showing the structure of an image display apparatus according to a seventh embodiment of the present invention.

FIG. 12 is a block diagram showing the structure of an image display apparatus according to the seventh embodiment of the present invention. In FIG. 12, the image display apparatus of the seventh embodiment includes a characteristics detection part 71, a control data generation part 72, an input signal processing part 73, the light source control part 16, and the passive light modulation part 17. The input signal processing part 73 includes a signal amplitude adjustment part 73A and a DC level adjustment part 73B. The passive light modulation part 17 includes the light source 18.

As shown in FIG. 12, the image display apparatus of the seventh embodiment is provided with the characteristics detection part 71, the control data generation part 72, and the input signal processing part 73 in place of the characteristics detection part 11, the control data generation part 12, and the input signal processing part 13 of the image display apparatus of the first embodiment. Other components of the image display apparatus of the seventh embodiment are identical to those of the first embodiment, and are thus given the same reference numerals and not described again.

Now, the image display apparatus of the seventh embodiment of the present invention is described focusing on the components that differ from the image display apparatus of the first embodiment.

First, a video signal which is outputted by a video signal processing circuit (not shown) in a television receiver, computer, or the like, is supplied to the characteristics detection part 71 and the input signal processing part 73, as an input video signal. The characteristics detection part 71 detects, with respect to the input video signal, MAX, MIN, and a brightness level appearing most frequently in each field (hereinafter, referred to as HIST).

The control data generation part 72 receives MAX, MIN, and HIST detected by the characteristics detection part 71, and based on these levels, calculates Gain and Offset in the following manner.

The control data generation part 72 first calculates, according to the following equation, Gain for amplifying the maximum amplitude (difference between MAX and MIN) of the input video signal to a width of the range in which the processing circuit can perform signal processing, i.e., a dynamic range (specifically, an output dynamic range of the DC level adjustment part 73B).

$$\text{Gain} = \text{width of dynamic range}/(\text{MAX}-\text{MIN})$$

The calculated Gain is outputted to the signal amplitude adjustment part 73A.

Next, based on MAX, MIN, and the calculated Gain, the control data generation part 72 calculates Offset indicating the DC level that brings the input video signal, which is amplified by the signal amplitude adjustment part 73A with reference to HIST, within the output dynamic range. Offset is used to change the DC level of the amplified video signal so that the amplitude of the amplified video signal falls within the dynamic range. The calculated Offset is outputted to the DC level adjustment part 73B.

The signal amplitude adjustment part 73A receives the input video signal, HIST outputted by the characteristics detection part 71, and Gain outputted by the control data generation part 72. The signal amplitude adjustment part 73A amplifies the input video signal with reference to HIST and in accordance with Gain. The amplified video signal is outputted to the DC level adjustment part 73B.

The DC level adjustment part 73B receives the amplified video signal outputted by the signal amplitude adjustment part 73A and Offset outputted by the control data generation part 72. The DC level adjustment part 73B shifts the DC level of the amplified video signal in accordance with Offset. The amplified video signal after level shift (output video signal) is outputted to the passive light modulation part 17, and then displayed on a screen as an image.

The light source control part 16 carries out, in accordance with Offset, predetermined brightness adjustment on the light source 18. The brightness adjustment is carried out in such a manner that the visual brightness level of the output video signal becomes equal to the brightness level of the input video signal, that is to say, HIST of output video signal when displayed as image on the passive light modulation part 17 becomes equal to HIST of the input video signal.

As described in the foregoing, according to the image display apparatus and method of the seventh embodiment of the present invention, brightness adjustment of the light source 18 is carried out to have correlation between signal amplitude control performed by the input signal processing part 73, thereby accommodating a HIST variation in the output video signal with respect to the input video signal. Accordingly, the image display apparatus and method of the seventh embodiment are capable of visually improving a sense of contrast without increasing average power consumption of the light source 18.

In the seventh embodiment, described is the case that the components of the characteristics detection part 71, the control data generation part 72, and the input signal processing part 73 are applied to the image display apparatus of the first embodiment. It is also possible, however, to achieve the same effects by applying such components to the image display apparatuses of the third to the fifth embodiments. Further, in the image display apparatus of the seventh embodiment, the same effect can be achieved even if the signal amplitude adjustment part 73A and the DC level adjustment part 73B of the input signal processing part 73 are interchanged in structural order as described in the second embodiment.

EIGHTH EMBODIMENT

In the description of the first to the fifth embodiments, contrast adjustment is performed with reference to APL. However, such contrast adjustment can surely be performed with reference to any other predetermined DC level. Therefore, in an eighth embodiment, described is an image display apparatus adjusting contrast with reference to an arbitrarily predetermined DC level.

Figure 13:
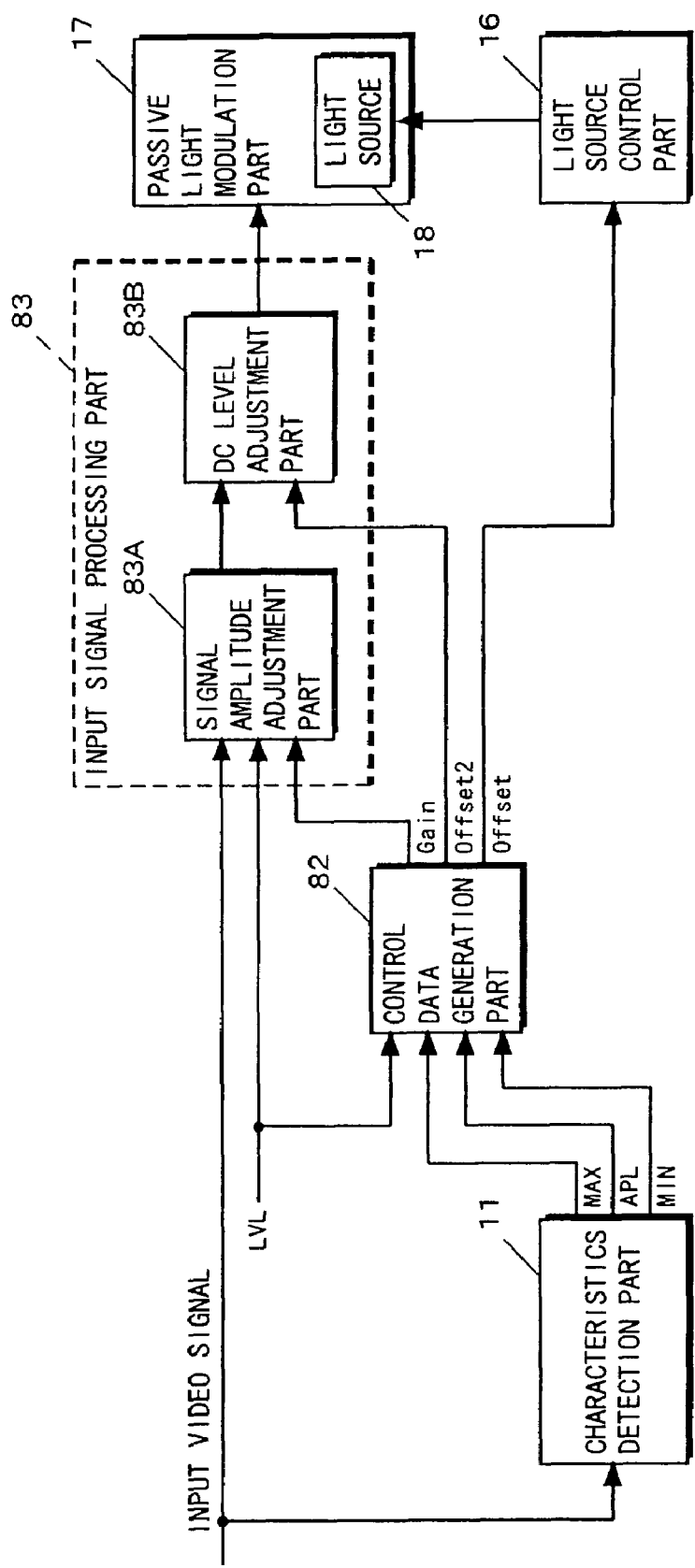
FIG. 13 is a block diagram showing the structure of an image display apparatus according to an eighth embodiment of the present invention.

FIG. 13 is a block diagram showing the structure of an image display apparatus according to the eighth embodiment of the present invention. In FIG. 13, the image display apparatus of the eighth embodiment includes the characteristics detection part 11, a control data generation part 82, an input signal processing part 83, the light source control part 16, and the passive light modulation part 17. The input signal processing part 83 includes a signal amplitude adjustment part 83A and a DC level adjustment part 83B. The passive light modulation part 17 includes the light source 18.

As shown in FIG. 13, the image display apparatus of the eighth embodiment is provided with the control data generation part 82 and the input signal processing part 83 in place of the control data generation part 12 and the input signal processing part 13 of the image display apparatus of the first embodiment. Other components of the image display apparatus of the eighth embodiment are identical to those of the first embodiment, and are thus given the same reference numerals and not described again.

Now, the image display apparatus of the eighth embodiment of the present invention is described focusing on the components that differ from the image display apparatus of the first embodiment.

The control data generation part 82 receives MAX, MIN, and APL detected by the characteristics detection part 11 and an arbitrarily predetermined DC level (hereinafter, referred to as LVL), and then calculates Gain, Offset, and an adjustment DC level of APL having the basis on LVL (Hereinafter, referred to as Offset2) in the following manner.

The control data generation part 82 first calculates, according to the following equation, Gain for amplifying the maximum amplitude (difference between MAX and MIN) of an input video signal to a width of the range in which the processing circuit can perform signal processing, i.e., a dynamic range (specifically, an output dynamic range of the signal amplitude adjustment part 83A).

Gain=width of dynamic range/(MAX−MIN)

The calculated Gain is outputted to the signal amplitude adjustment part 83A.

Next, based on Offset stated in the first embodiment and MAX, MIN, and the calculated Gain, the control data generation part 82 calculates Offset2 indicating the DC level that brings the input video signal, which is amplified by the signal amplitude adjustment part 83A with reference to LVL, within the output dynamic range. Offset2 is used to change the DC level of the amplified video signal so that the amplitude of the amplified video signal falls within the dynamic range. The calculated Offset is outputted to light source control part 16 and the calculated Offset2 is outputted to the DC level adjustment part 83B.

The signal amplitude adjustment part 83A receives the input video signal, Gain outputted by the control data generation part 82, and LVL. The signal amplitude adjustment part 83A amplifies the input video signal with reference to LVL and in accordance with Gain.

The DC level adjustment part 83B receives the amplified video signal outputted by the signal amplitude adjustment part 83A and Offset2 outputted by the control data generation part 82. The DC level adjustment part 83B then shifts the DC level of the amplified video signal by a value of Offset2. The amplified video signal after level shift (output video signal) is outputted to the passive light modulation part 17, and then displayed on a screen as an image.

As described in the foregoing, according to the image display apparatus and method of the eighth embodiment of the present invention, brightness adjustment of the light source 18 is carried out to have correlation between signal amplitude control performed by the input signal processing part 83, thereby accommodating an APL variation in the output video signal with respect to the input video signal. Accordingly, the image display apparatus and method of the eighth embodiment are capable of visually improving a sense of contrast without increasing average power consumption of the light source 18.

In the eighth embodiment, described is the case that the components of the control data generation part 82 and the input signal processing part 83 are applied to the image display apparatus of the first embodiment. It is also possible, however, to achieve the same effects by applying such components to the image display apparatuses of the second to the fifth embodiments.

Further, in the eighth embodiment, described is the case where externally supplied LVL serves as the arbitrary DC level, which is the reference for contrast adjustment. However, the arbitrary DC level may be a value that can be generated internally. Such value includes a minimum value of the system (lower limit value of the output dynamic range of the signal amplitude adjustment part 83A) and a maximum value of the system (upper limit value of the output dynamic range of the signal amplitude adjustment part 83A).

NINTH EMBODIMENT

In the first to the eighth embodiments above, description is made of the image display apparatuses and methods capable of visually improving a sense of contrast without increasing power consumption of the light source by adjusting contrast and light source brightness to have correlation. Such adjustments of contrast and light source brightness are done only focusing on the characteristics of input video signal but not on physical characteristics of the light source.

Therefore, in a ninth embodiment, described is an image display apparatus and an image display method capable of dynamically and optimally adjusting the intensity of the light source according to an input video signal by utilizing a range in the vicinity of a characteristic at which the light-emitting efficiency of the light source reaches maximum.

Figure 14:
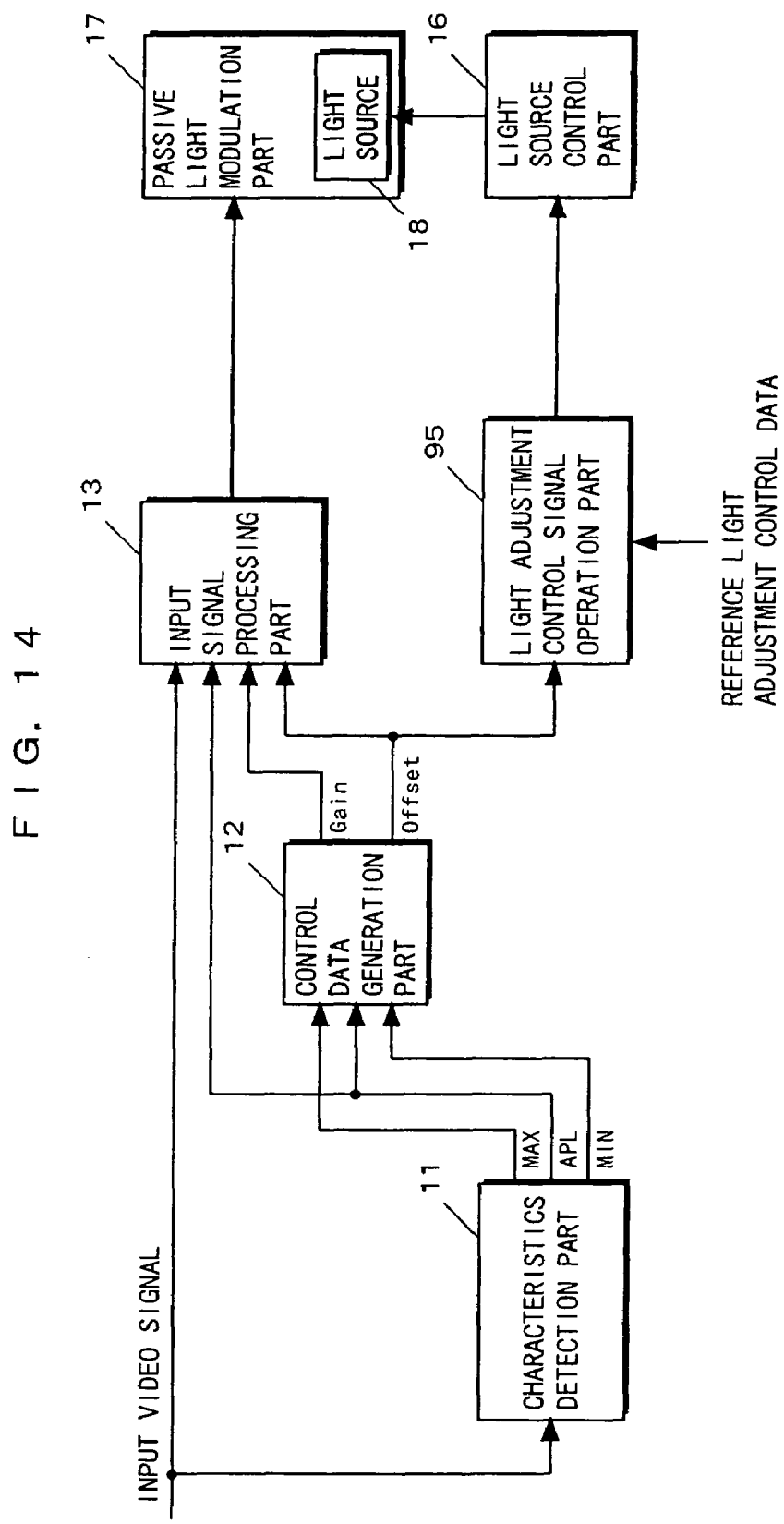
FIG. 14 is a block diagram showing the structure of an image display apparatus according to a ninth embodiment of the present invention.

FIG. 14 is a block diagram showing the structure of an image display apparatus according to the ninth embodiment of the present invention. In FIG. 14, the image display apparatus of the ninth embodiment includes the characteristics detection part 11, the control data generation part 12, the input signal processing part 13, a light adjustment control signal operation part 95, the light source control part 16, and the passive light modulation part 17. The passive light modulation part 17 includes the light source 18, which is a fluorescence lamp.

As shown in FIG. 14, the image display apparatus of the ninth embodiment is provided with the light adjustment control signal operation part 95 in addition to the image display apparatus of the first embodiment. Other components of the image display apparatus of the ninth embodiment are identical to those of the first embodiment, and are thus given the same reference numerals and not described again.

Hereinafter, by further referring to FIG. 15 to FIG. 19, the components and operation (image display method) of the image display apparatus of the ninth embodiment of the present invention are described focusing on the component that differs from the image display apparatus of the first embodiment.

Figure 16:
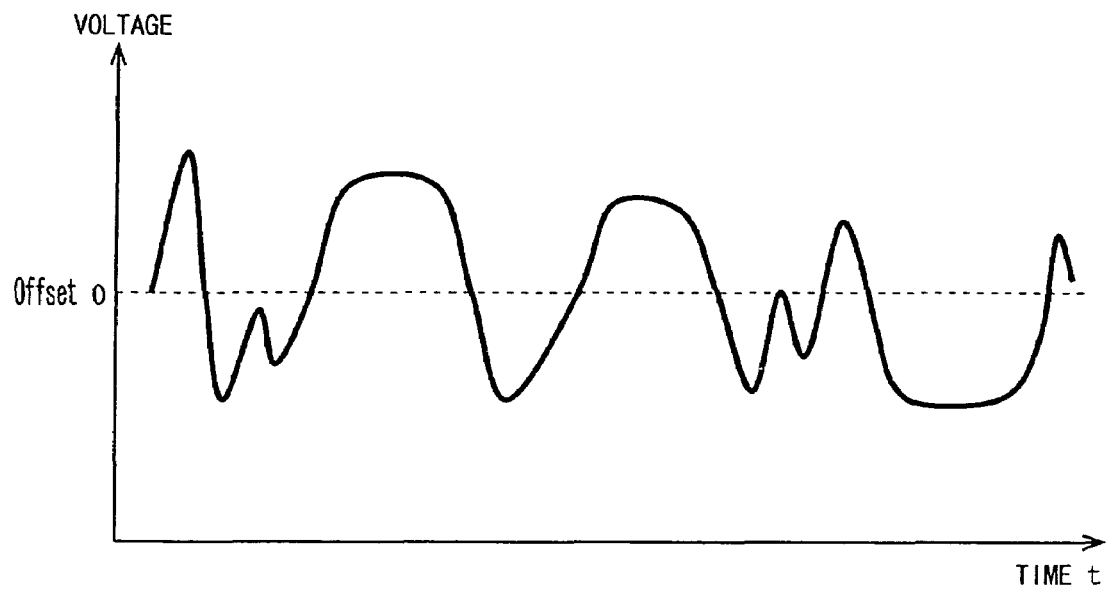
FIG. 16 is a diagram exemplarily showing a waveform of light adjustment control data calculated by a control data generation part 12 of FIG. 14.

The light adjustment control signal operation part 95 receives Offset (hereinafter, referred to as light adjustment control data) outputted by the control data generation part 12 as shown in FIG. 16, and separately receives reference light adjustment control data indicating the predetermined lamp tube current $i_0$ at which the light-emitting efficiency of the light source 18 reaches maximum. Based on the reference light adjustment control data, the light adjustment control signal operation part 95 generates and outputs another light adjustment control data. With the another light adjustment control data, the lamp tube current i of the light source 18 is controlled only for components in the light adjustment control data that vary within a predetermined period.

Figure 15:
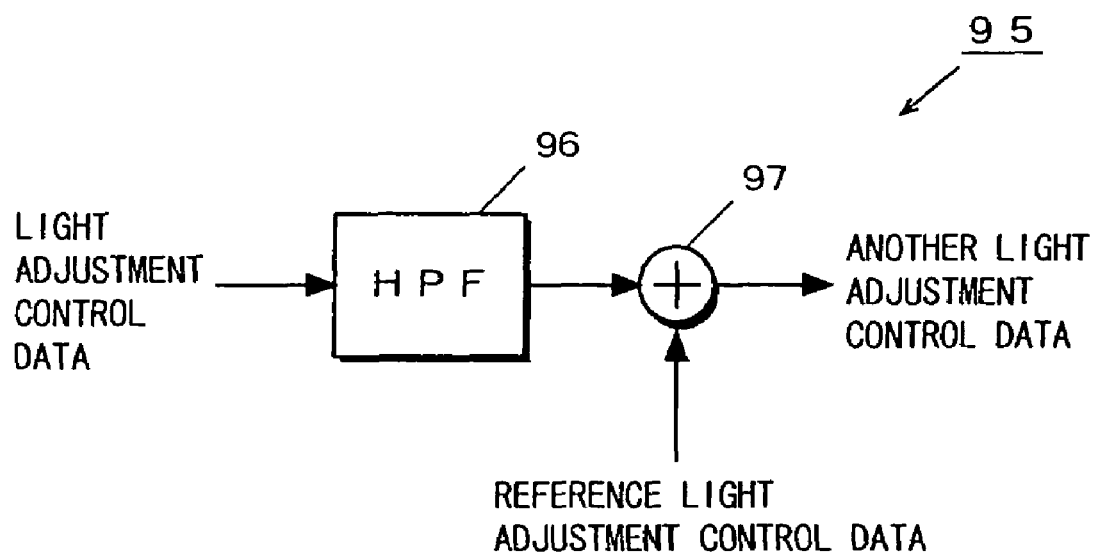
FIG. 15 is a block diagram exemplarily showing the detailed structure of a light adjustment control signal operation part 95 of FIG. 14.

FIG. 15 is an exemplary block diagram showing the detailed structure of the light adjustment control signal operation part 95 of FIG. 14. In FIG. 15, the light adjustment control signal operation part 95 includes a high-pass filter (hereinafter, referred to as HPF) 96 and an addition part 97. Now, by further referring to FIG. 15, an example of specific operation of the light adjustment control signal operation part 95 is described.

Figure 17:
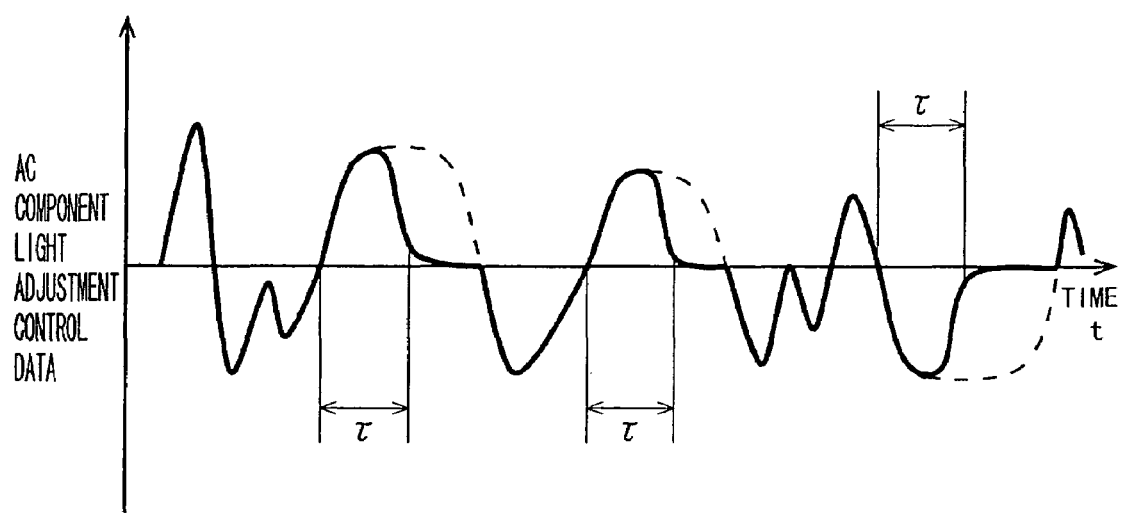
FIG. 17 is a diagram showing a waveform of AC component light adjustment control data which is obtained after the light adjustment control data of FIG. 16 has passed through an HPF 96.
Figure 18A:
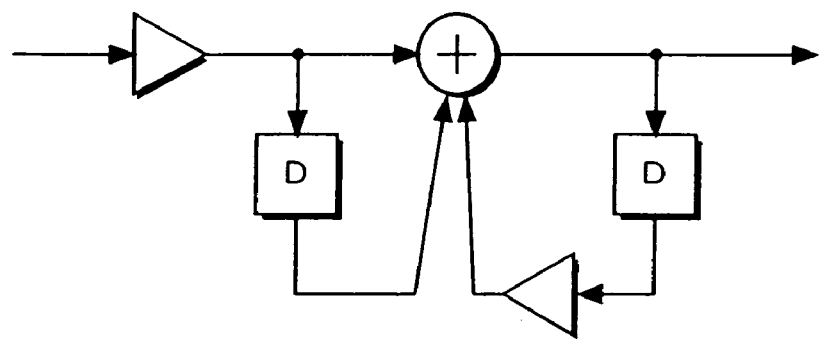
FIGS. 18a and 18b are block diagrams exemplarily showing the structures of the HPF 96 of FIG. 15 in more detail.
Figure 18B:
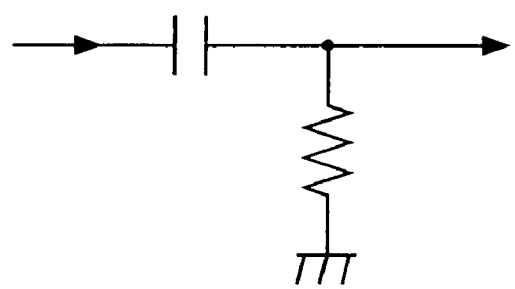

The HPF 96 is a high-pass filter that has been generally used and having a time constant τ, and among the light adjustment control data outputted by the control data generation part 12, passes only AC components that vary within the time constant [^]. The time constant τ is determined depending on the characteristics of lamp temperature when rises/falls in response to increment/decrement of the lamp tube current i of the light source 18 occur (will be described later). For example, when the time constant τ is set as 10 seconds, only the light adjustment control data that varies within 10 seconds passes through the HPF 96. In FIG. 17, shown is a waveform of AC component light adjustment control data which is obtained after the light adjustment control data of FIG. 16 has passed through the HPF 96. Further, in FIGS. 18a and 18b, the structures of the HPF 96 are exemplarily shown in more detail. The HPF 96 is exemplarily structured with a digital circuit in FIG. 18a and with an analog circuit in FIG. 18b. As these circuits have been conventionally used in general, detailed description is not made herein.

The addition part 97 receives the reference light adjustment control data separately provided thereto and the AC component light adjustment control data outputted by the HPF 96, and adds both for output. Accordingly, the light adjustment control signal operation part 95 is able to generate another light adjustment control data. With the another light adjustment control data, adjustment of the light source 18 is performed in such a manner that, while the lamp tube current $i_0$ is regarded as a control reference value, the lamp tube current i is increased or decreased following the brightness variation that occurs within the time constant τ, and is brought back to the lamp tube current $i_0$ as being the control reference value for the brightness variation that occurs at a time exceeding the time constant τ (FIG. 17).

Here, the time constant τ of the HPF 96 is set as a time period that the increment/decrement of the lamp tube current i of the light source 18 hardly affects the rise/fall of the lamp temperature, that is, a time period in which the response characteristic of temperature variation is unsatisfactory (bad). As a result, for the brightness variation within the short time period that cannot be caught up by the lamp temperature variation, the light adjustment control signal operation part 95 enables control that is reflected in light adjustment by making the lamp tube current i vary in accordance with such brightness variation. For the brightness variation lasting for the long time period that causes the lamp temperature variation, the light adjustment control signal operation part 95 enables such control as to always keep the lamp temperature in the range in the vicinity of the characteristic to maximize the light-emitting efficiency (optimum temperature), by making the lamp tube current i to be brought back to the current $i_0$ being the control reference value, after the variation exceeds the time constant τ.

Figure 19:
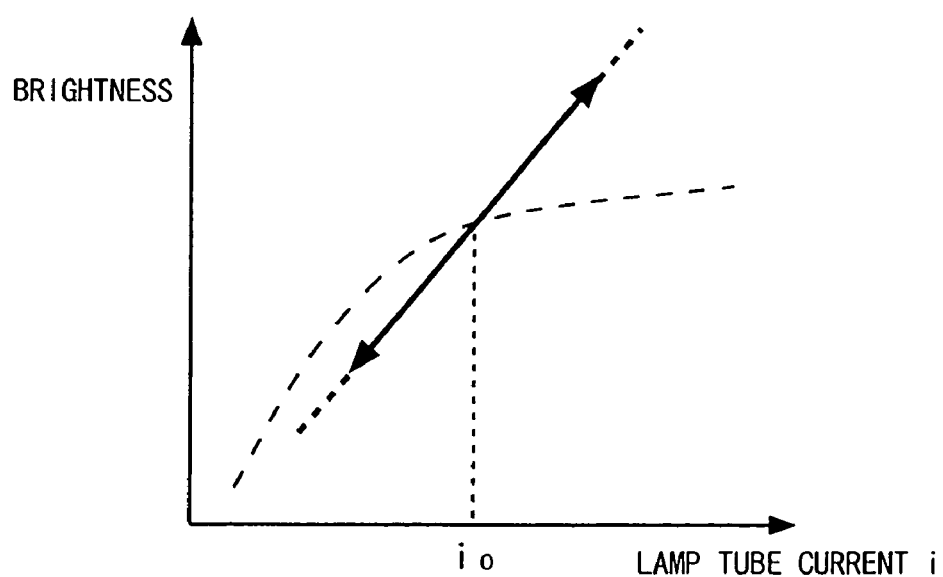
FIG. 19 is a diagram exemplarily showing a characteristic of lamp tube current to brightness of a general fluorescence lamp in the image display apparatus according to the ninth embodiment of the present invention.
Figure 29:
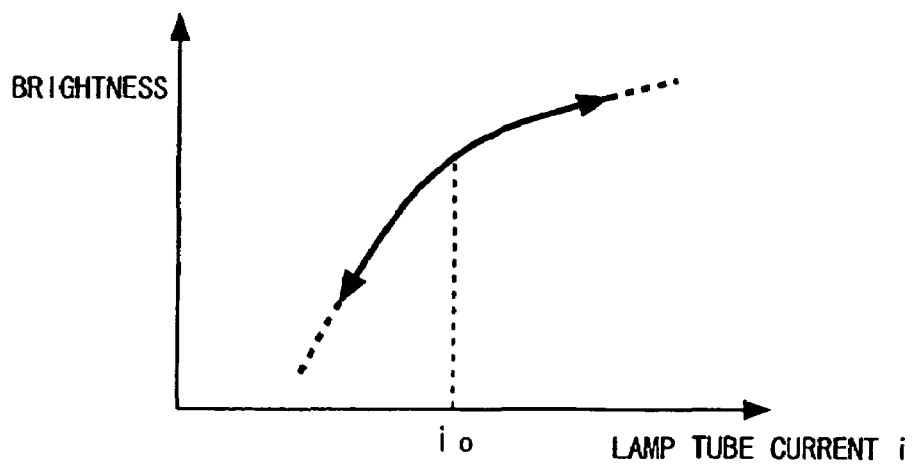
FIG. 29 is a diagram exemplarily showing a characteristic of lamp tube current to brightness of the general fluorescence lamp.

Accordingly, the light adjustment control signal operation part 95 is capable of having the intensity of the light source 18 adjusted in a dynamic manner under the condition that the light-emitting efficiency thereof is always maximized. FIG. 19 is a diagram exemplarily showing a characteristic of lamp tube current to brightness of the general fluorescence lamp in the image display apparatus according to the ninth embodiment of the present invention. In FIG. 19, a solid line shows the characteristic in the image display apparatus of the present embodiment and a dotted line shows the characteristic in the conventional image display apparatus (liquid crystal display apparatus) as shown in FIG. 29.

The light source control part 16, in accordance with the another light adjustment control data outputted by the light adjustment control signal operation part 95 (in the example of FIG. 15, added and outputted by the addition part 97), controls the value of the lamp tube current i of the light source 18, thereby dynamically controlling the light adjustment of the light source 18.

As described in the foregoing, according to the image display apparatus and method of the ninth embodiment of the present invention, in addition to the control described in the first embodiment, such control that the lamp tube current i becomes (being brought back to) the current $i_0$ being the control reference value is carried out based on the predetermined time constant τ for the brightness variation that causes the lamp temperature variation exceeding the characteristic range to maximize the light-emitting efficiency of the light source 18.

As a result, the image display apparatus and method of the ninth embodiment are capable of controlling the lamp temperature to be always optimum, and dynamically adjusting the intensity of the light source 18 under the condition to always maximize the light-emitting efficiency thereof. Accordingly, the image display apparatus and method of the ninth embodiment are capable of improving the efficiency of light adjustment to a greater extent than ever although the effect of visual improvement in a sense of contrast, which was described in the first embodiment, is more or less reduced.

TENTH EMBODIMENT

In the ninth embodiment above, the current $i_0$ at which the light-emitting efficiency of the light source 18 reaches maximum is regarded as the control reference value, and control is carried out so that the lamp tube current i becomes the control reference value for a specific brightness variation. When the image display apparatus is actually commercialized as a product, however, the temperature of the light source 18 may rise due to heat radiation by itself and by circuitry components inside the apparatus. In such case, with the rise in the temperature of the light source 18, the current $i_0$ at which the light-emitting efficiency reaches maximum is shifted to the actual lower value. Therefore, in some cases, the control reference value is required to be set at a value equal to or more than the current $i_0$ in order to secure the brightness required as a product (hereinafter, referred to as standard brightness).

In those cases, as to the lamp tube current i equal to or more than a current value set as the control reference value to secure the standard brightness (hereinafter, referred to as current $i_{STD}$), the control described in the ninth embodiment, if performed, is able to achieve the effect of dynamically and efficiently adjusting brightness while securing the required standard brightness. As to the lamp tube current i less than the current $i_{STD}$, however, the control described in the ninth embodiment, if performed, disadvantageously results in reduction of the efficiency (this is because, with respect to every specific brightness variation, the lamp tube current i is controlled to become the current $i_{STD}$ higher than the current $i_0$ at which the light-emitting efficiency is maximized). Therefore, in the tenth embodiment, described is an image display apparatus capable of dynamically and efficiently adjusting brightness even in the cases described above.

Figure 20:
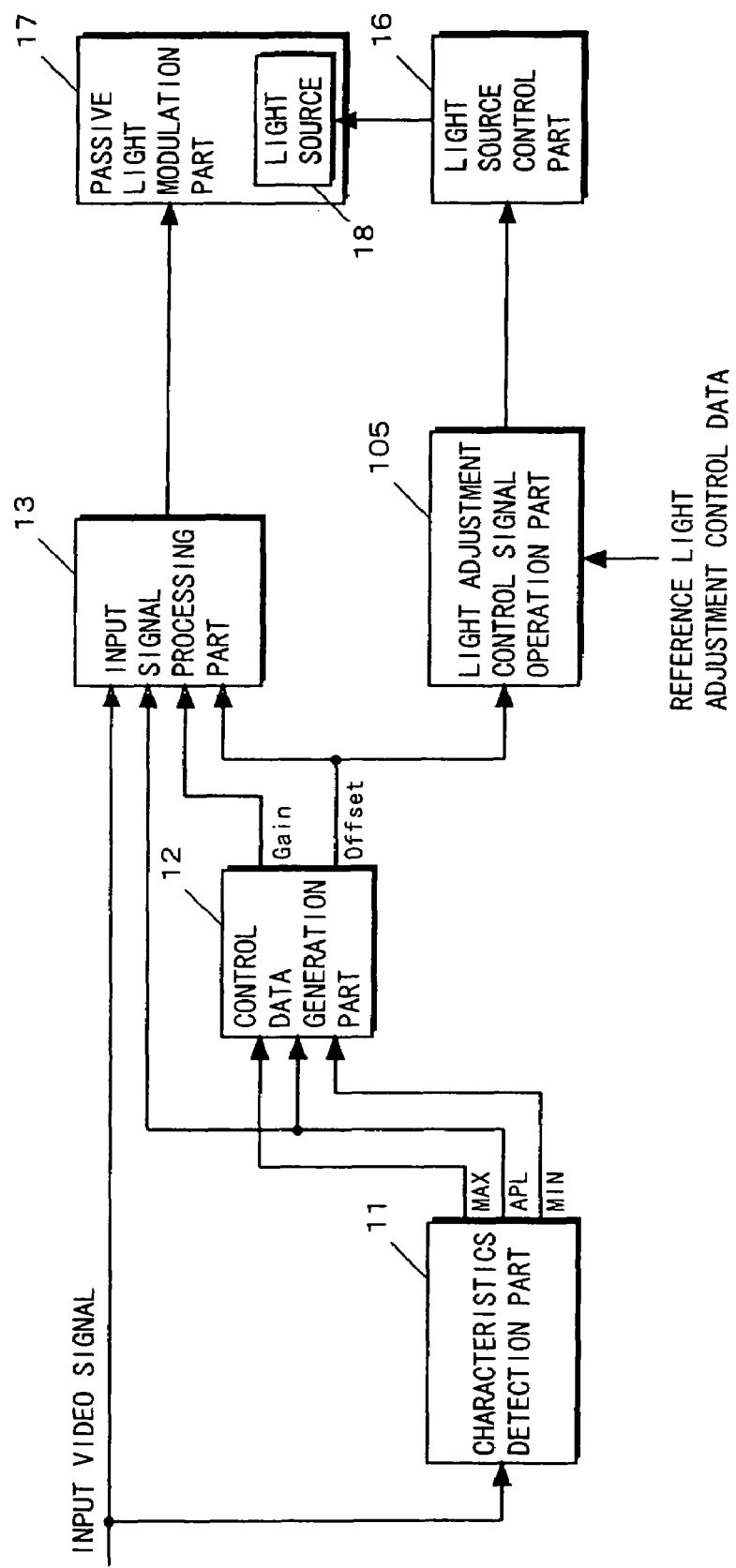
FIG. 20 is a block diagram showing the structure of an image display apparatus according to a tenth embodiment of the present invention.

FIG. 20 is a block diagram showing the structure of an image display apparatus according to the tenth embodiment of the present invention. In FIG. 20, the image display apparatus of the tenth embodiment includes the characteristics detection part 11, the control data generation part 12, the input signal processing part 13, a light adjustment control signal operation part 105, the light source control part 16, and the passive light modulation part 17. The passive light modulation part 17 includes the light source 18, which is a fluorescence lamp.

As shown in FIG. 20, the image display apparatus of the tenth embodiment is provided with the light adjustment control signal operation part 105 in place of the light adjustment control signal operation part 95 of the image display apparatus according to the ninth embodiment. Other components of the image display apparatus of the tenth embodiment are identical to those of the ninth embodiment, and are thus given the same reference numerals and not described again.

Figure 21:
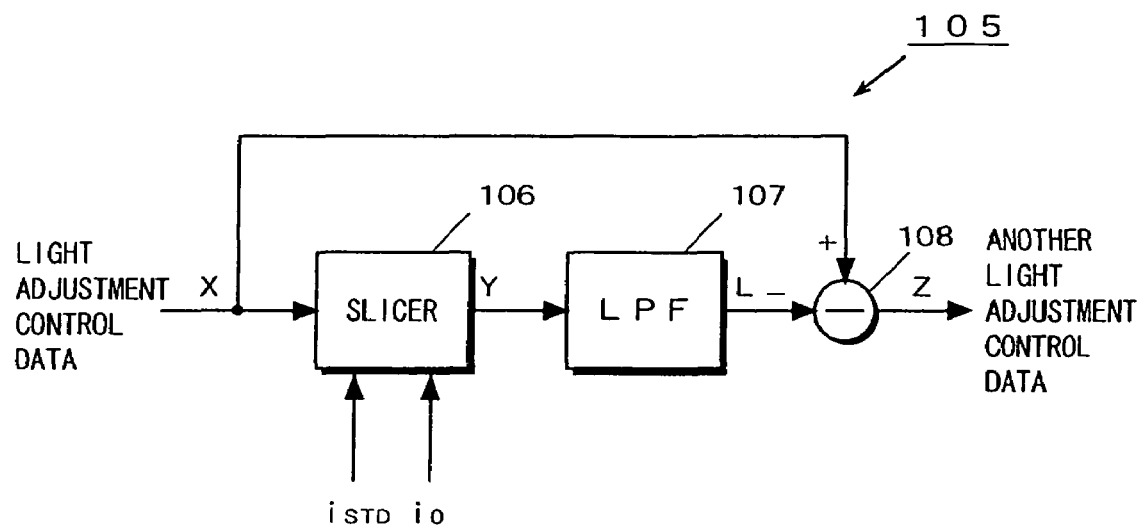
FIG. 21 is a block diagram exemplarily showing the detailed structure of a light adjustment control signal operation part 105 of FIG. 20.
Figure 22:
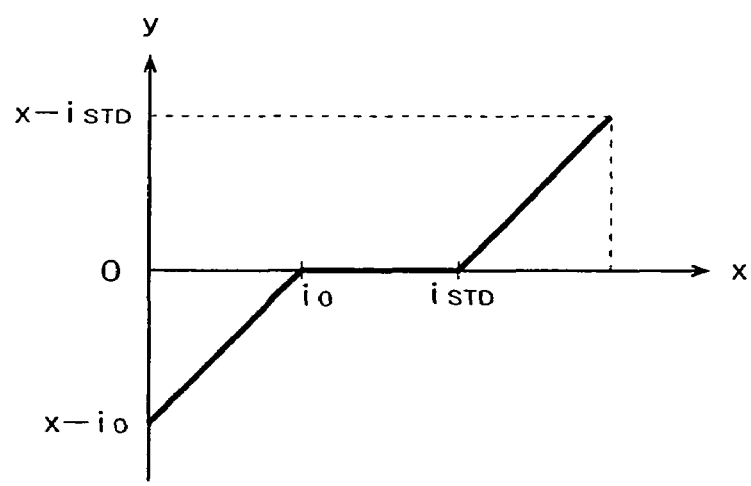
FIG. 22 is a diagram showing an input/output characteristic of a slicer 106 of FIG. 21.

Now, by further referring to FIG. 21 to FIG. 23, the components and operation (image display method) of the image display apparatus of the tenth embodiment of the present invention are described focusing on the differences between the image display apparatus according to the ninth embodiment.

FIG. 21 is an exemplary block diagram showing the detailed structure of the light adjustment control signal operation part 105 of FIG. 20. In FIG. 21, the light adjustment control signal operation part 105 includes a slicer 106, a low-pass filter (hereinafter, referred to as LPF) 107, and a subtraction part 108.

Light adjustment control data outputted by the control data generation part 12 is supplied to the slicer 106 and the subtraction part 108. The slicer 106 receives, as well as the light adjustment control data, the current $i_{STD}$ set in advance, as reference light adjustment control data, to secure the required standard brightness, and the current $i_0$ at which the light-emitting efficiency of the light source 18 reaches maximum. Then, according to the following equations, the slicer 106 converts received light adjustment control data X into variation difference data Y for output.

$$Y=X-i_{STD} \ (X>i_{STD})$$

$$Y=0 \ (i_o \leq X \leq i_{STD})$$

$$Y=X-i_0 \ (X<i_0)$$

Figure 23A:
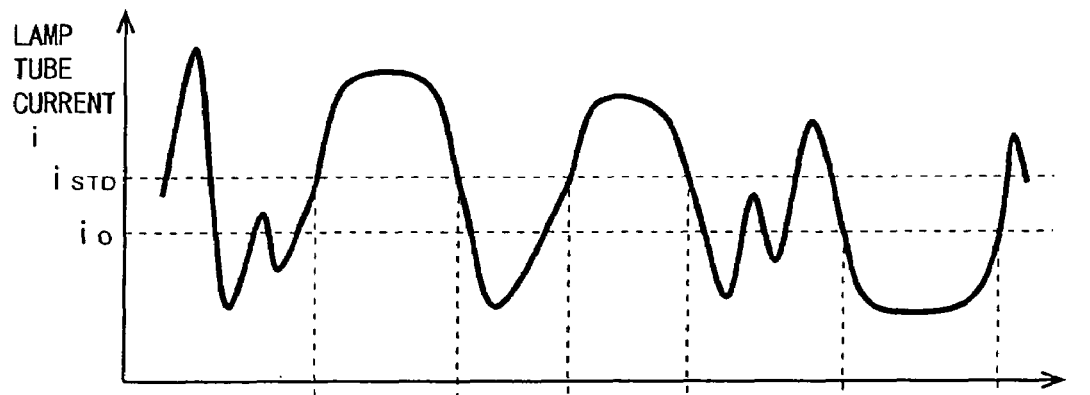
FIGS. 23a-23d are diagrams exemplarily showing respective waveforms of light adjustment control data obtained in components of the light adjustment control signal operation part 105 shown in FIG. 21.

An input/output characteristic of the slicer 106 is shown in FIG. 22. When the light adjustment control data X shown in FIG. 23a is supplied, the slicer 106 outputs the variation difference data Y of a waveform shown in FIG. 23b.

Figure 23B:
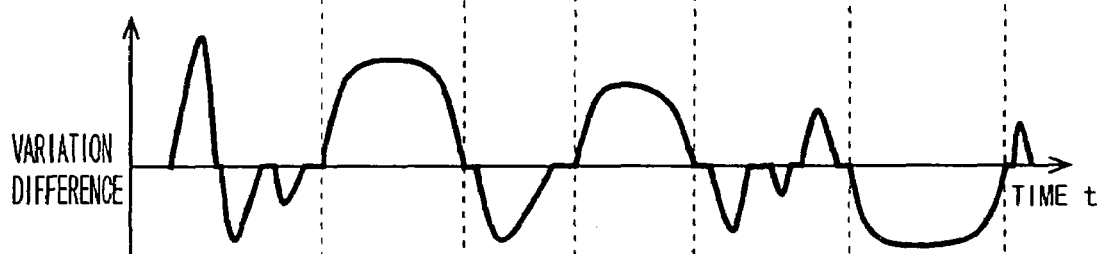
Figure 23C:
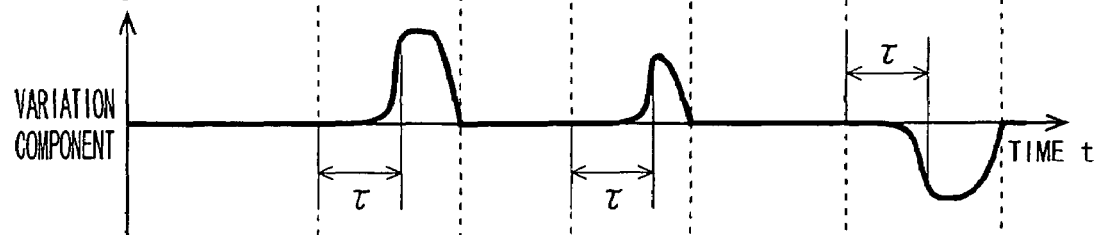

The LPF 107 is a low-pass filter that has been generally used and having a time constants τ, and among the variation difference data Y outputted by the slicer 106, passes only signal components (both AC and DC components) that vary for the long time period exceeding the time constant τ. Similar to the HPF 96 described in the ninth embodiment, the time constant τ is determined depending on the characteristics of lamp temperature when rises/falls in response to increment/decrement of the lamp tube current i of the light source 18 occur. Accordingly, when the variation difference data Y shown in FIG. 23b is supplied, the LPF 107 outputs variation component light adjustment control data L of a waveform as shown in FIG. 23c.

Figure 23D:
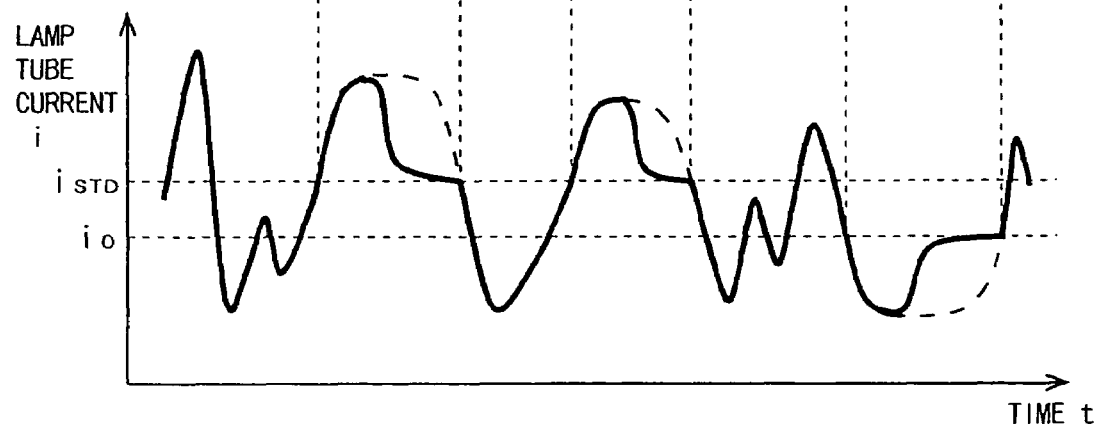

The subtraction part 108 receives the light adjustment control data X and the variation component light adjustment control data L, and subtracts the variation component light adjustment control data L from the light control data X to output another light adjustment control data Z (FIG. 23d).

As a result, for the brightness variation that occurs within the time constant τ, the light adjustment control signal operation part 105 enables light adjustment of the light source 18 by increasing or decreasing the lamp tube current i so as to follow the variation. For the brightness variation that occurs at a time exceeding the time constant τ, the light adjustment control signal operation part 105 enables such control as to bring back the lamp tube current i to the current $i_{STD}$ being the control reference value for the standard brightness (upper control reference value), if the lamp tube current i corresponding to the variation is equal to or more than the current $i_{STD}$, and if the lamp tube current i is equal to or less than the current $i_0$, bring back the lamp tube current i to the current $i_0$ being the control reference value for the maximum light-emitting efficiency (lower control reference value).

As described in the foregoing, according to the image display apparatus and method of the tenth embodiment of the present invention, in addition to the control described in the first embodiment, another control is carried out for the case where the control reference value is required to be set at a value equal to or more than the current $i_0$ at which the light-emitting efficiency of the light source 18 is maximized. Such control is carried out, based on the predetermined time constant τ, so that the lamp tube current i used for light adjustment becomes (being brought back to) the current $i_{STD}$ being the upper control reference value for the specific brightness variation when the lamp tube current i is equal to or more than the current $i_{STD}$, and for the specific brightness variation when the lamp tube current i is equal to or less than the current $i_0$, so that the lamp tube current i used for light adjustment becomes (being brought back to) the current $i_0$ that is the lower control reference value.

As a result, the image display apparatus and method of the tenth embodiment are capable of dynamically adjusting the light intensity for the specific brightness variation when the lamp tube current i is equal to or more than the current $i_{STD}$ while securing the required standard brightness, and for the specific brightness variation when the lamp tube current i is equal to or less than the current $i_0$, capable of dynamically adjusting the light intensity under the condition to maximize the light-emitting efficiency. Accordingly, the image display apparatus and method of the tenth embodiment are capable of improving the efficiency of light adjustment to a greater extent than ever although the effect of visual improvement in a sense of contrast, which was described in the first embodiment, is more or less reduced.

In the tenth embodiment, the image display apparatus is described to control the lamp tube current i used for light adjustment to become the current $i_0$ even for the specific brightness variation when the lamp tube current i is equal to or less than the current $i_0$ being the lower control reference value. However, even if a user intentionally wants a dim screen in total appearance (if light adjustment is performed manually (contrast adjustment etc.), for example)), the control described above, if performed, makes the black level look not as it should be in total appearance, thereby disturbing the screen to look dim.

Therefore, for such case that the user wants a dim screen in total appearance, the image display apparatus may refrain from control for the specific brightness variation when the lamp tube current i is not more than the current $i_0$, or may lower the current $i_0$ being the control reference value and carry out control so that the lamp tube current i becomes the lowered current value. In the former case, the slicer 106 is set to convert, for output, the received light adjustment control data X into the variation difference data Y according to the following equations.

$Y = X - i_{STD}$ $(X > i_{STD})$ $Y = 0$ $(X \leq i_{STD})$

Figure 24A:
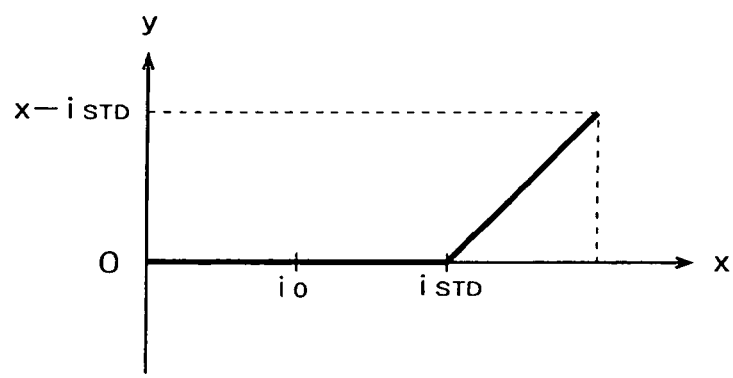
FIGS. 24a and 24b are diagrams showing another input/output characteristic of the slicer 106 of FIG. 21 and a waveform of light adjustment control data outputted by a subtraction part 108.
Figure 24B:
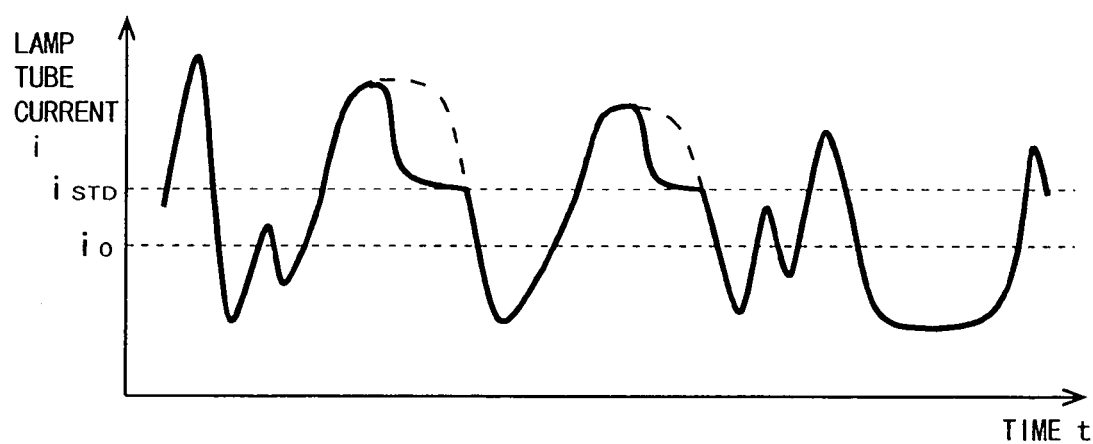

An input/output characteristic of the slicer 106 in this case is shown in FIG. 24a, and FIG. 24b shows a wave form of the light adjustment control data Z outputted by the subtraction part 108 when receiving the light adjustment control data X shown in FIG. 23a.

In the tenth embodiment, the upper control reference value $i_{STD}$ is assumed to be the light adjustment control data for the standard brightness, but it may be light adjustment control data for an average lamp tube current determined based on the lamp life required as a product.

ELEVENTH EMBODIMENT

In the tenth embodiment above, it is stated that, when the image display apparatus is actually commercialized as a product, the temperature of the light source 18 may rise due to heat radiation by itself and by circuitry components inside the apparatus. Variation of environmental temperature is considered as another cause of the temperature variation of the light source 18, and with such variation of the environmental temperature, the temperature around the light source 18 varies by time. Due to this, depending on the environmental temperature, the current $i_0$ previously set as the control reference value may not be a current value at which the light-emitting efficiency of the light source 18 is maximized. Therefore, in an eleventh embodiment, described is an image display apparatus capable of always adjusting brightness under the maximum light-emitting efficiency even in the case described above.

FIG. 25 is a block diagram showing the structure of an image display apparatus according to the eleventh embodiment of the present invention. In FIG. 25, the image display apparatus of the eleventh embodiment includes the characteristics detection part 11, the control data generation part 12, the input signal processing part 13, the light adjustment control signal operation part 95 (or 105), a reference light adjustment control data operation part 118, a sensor 119, the light source control part 16, and the passive light modulation part 17. The passive light modulation part 17 includes the light source 18, which is a fluorescence lamp.

As shown in FIG. 25, the image display apparatus of the eleventh embodiment is provided with the reference light adjustment control signal operation part 118 and the sensor 119 in addition to the image display apparatus according to the ninth or the tenth embodiment. Other components of the image display apparatus of the eleventh embodiment are identical to those of the ninth and the tenth embodiments, and are thus given the same reference numerals and not described again.

Now, the components and operation (image display method) of the image display apparatus according to the eleventh embodiment of the present invention are described focusing on the differences between the image display apparatus according to the ninth and the tenth embodiments.

The sensor 119 is a general sensor for detecting a physical amount of temperature, light, and the like, and outputting the result, and is placed in proximity of the light source 18. If the sensor 119 is a temperature sensor, it detects the temperature therearound (i.e., proximity of the light source 18), and outputs the detection result to the reference light adjustment control data operation part 118. If the sensor 119 is an optical sensor, it detects a light amount of the light source 18, and outputs the detection result to the reference light adjustment control data operation part 118.

Figure 28:
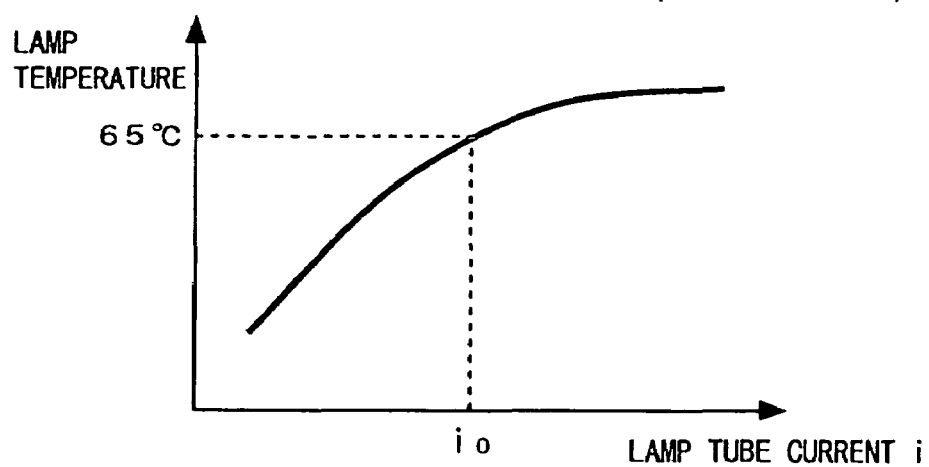
FIG. 28 is a diagram exemplarily showing a characteristic of lamp tube current to lamp temperature of the general fluorescence lamp.

Based on the detection result outputted by the sensor 119, the reference light adjustment control data operation part 118 calculates the lamp tube current $i_0$ at which the light-emitting efficiency of the light source 18 reaches maximum, and supplies the same to the light adjustment control signal operation part 95 (or 105) as reference light adjustment control data. Herein, if the detection result is a temperature, the reference light adjustment control data operation part 118 calculates the lamp tube current $i_0$ at which the light-emitting efficiency of the light source 18 is maximized in accordance with the characteristic of lamp tube current to lamp temperature (see FIG. 28). If the detection result is a light amount, the reference light adjustment control data operation part 118 calculates the lamp tube current $i_0$ at which the light-emitting efficiency of the light source 18 is maximized by computing the light-emitting efficiency based on a ratio between the light amount and the lamp tube current.

As described in the foregoing, according to the image display apparatus and method of the eleventh embodiment of the present invention, in addition to the control described in the ninth and the tenth embodiments, the sensor 119 is provided in proximity of the light source 18, and in accordance with the detection result from the sensor 119, the lamp tube current $i_0$ to maximize the light-emitting efficiency of the light source 18 is calculated.

As a result, in addition to the effects described in the ninth and the tenth embodiments, the image display apparatus and method of the eleventh embodiment is capable of always dynamically adjusting light intensity under the condition that the light-emitting efficiency of the light source 18 is maximized, without being affected by the environmental temperature when in use.

TWELFTH EMBODIMENT

In the ninth to the eleventh embodiments above, described are the image display apparatuses and the image display methods including a technique of dynamically and optimally adjusting intensity of the light source according to an input video signal by utilizing a range in the vicinity of a characteristic at which the light-emitting efficiency of the light source reaches maximum. Such technique is included in addition to a technique of visually improving a sense of contrast without increasing power consumption of the light source by carrying out contrast adjustment and brightness adjustment of the light source to have correlation. However, it is also possible to solely apply, to an input video signal, the technique of dynamically and optimally adjusting the intensity of the light source according to the input video signal by utilizing a range in the vicinity of a characteristic to maximize the light-emitting efficiency of the light source. Therefore, in a twelfth embodiment of the present invention, described is an image display apparatus and an image display method capable of, in a solely applied manner to an input video signal, dynamically and optimally adjusting the intensity of the light source according to an input video signal by utilizing a range in the vicinity of a characteristic to maximize the light-emitting efficiency of the light source.

Figure 26:
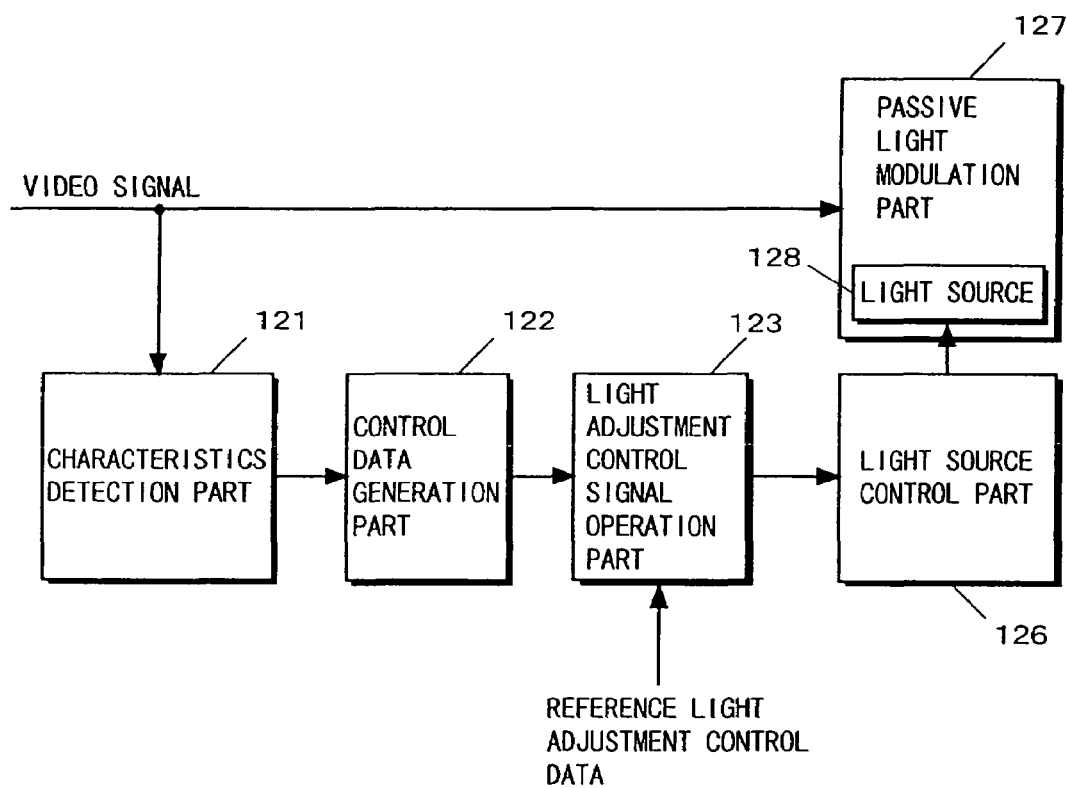
FIG. 26 is a block diagram showing the structure of an image display apparatus according to a twelfth embodiment of the present invention.
Figure 27:
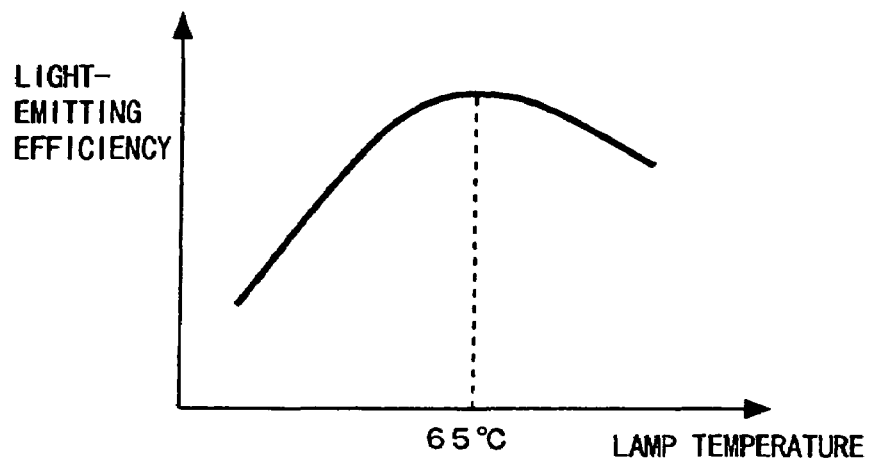
FIG. 27 is a diagram exemplarily showing a characteristic of lamp temperature to light-emitting efficiency of a general fluorescence lamp.

FIG. 26 is a block diagram showing the structure of an image display apparatus according to the twelfth embodiment of the present invention. In FIG. 26, the image display apparatus of the twelfth embodiment includes a characteristics detection part 121, a control data generation part 122, a light adjustment control signal operation part 123, a light source control part 126, and a passive light modulation part 127. The passive light modulation part 127 includes a light source 128, which is a fluorescence lamp.

A video signal which is outputted by a video signal processing circuit (not shown) in a television receiver, computer, or the like is supplied to the characteristics detection part 121 and the passive light modulation part 127. The passive light modulation part 127 displays the received video signal as a visible image by using light emitted by the light source 128.

The characteristics detection part 121 is a component equivalent to the above described characteristics detection part 11 and detects the average luminance level (APL) of an input video signal.

The control data generation part 122 is a component equivalent to the above described control data generation part 12. The control data generation part 122 receives APL detected by the characteristics detection part 121, and based on a difference between APL and a predetermined reference brightness level, calculates light adjustment control data for controlling the light source 128. Here, the predetermined reference brightness level is a brightness level requiring no control on the light source 128, that is, a brightness level at which the lamp tube current i becomes the current $i_0$. As described in the background art section, the current $i_0$ is a current value at which the light-emitting efficiency of the light source 128 reaches maximum. Accordingly, based on a predetermined light adjustment control amount, the control data generation part 122 calculates the light adjustment control data so that the lamp tube current i of the light source 128 becomes larger than the current $i_0$ when APL is lower than the reference brightness level and that the lamp tube current i of the light source 128 becomes smaller than the current $i_0$ when APL is higher than the reference brightness level (see FIG. 16).

The reference brightness level is not limited to a brightness level at which the lamp tube current i becomes the current $i_0$, and the similar effect can be achieved with a brightness level at which the lamp tube current i becomes a value more than the current $i_0$.

The light adjustment control signal operation part 123 is equivalent to the above described light adjustment control signal operation part 95, 105, or those including the reference light adjustment control data operation part 118 and the sensor 119. The light adjustment control signal operation part 123 receives the light adjustment control data outputted by the control data generation part 122, and based on the separately provided reference light adjustment control data indicating the predetermined lamp tube current $i_0$ to maximize the light-emitting efficiency of the light source 128, generates and outputs another light adjustment control data for controlling the value of the lamp tube current i of the light source 128 only for components, among the received light adjustment control data, that vary within a predetermined period.

In accordance with the another light adjustment control data outputted by the light adjustment control signal operation part 123 (or 105), the light source control part 126 controls the value of the lamp tube current i of the light source 128, thereby dynamically controlling the light adjustment of the light source 128.

As described in the foregoing, according to the image display apparatus and method of the twelfth embodiment of the present invention, it is possible to apply, for control with respect to an input signal, only the technique of dynamically and optimally adjusting the intensity of the light source according to an input video signal by utilizing a range in the vicinity of a characteristic to maximize the light-emitting efficiency of the light source, which is described in the ninth to the eleventh embodiments.

In the twelfth embodiment, it is described that the lamp tube current i used for light adjustment is controlled to become the current $i_0$ even for the specific brightness variation when the lamp tube current i is not more than the current $i_0$ being the control reference value. However, even if a user intentionally wants a dim screen in total appearance, the control described above, if performed, makes the black level look not as it should be in total appearance, thereby causing the screen to look dim. Therefore, for such case that the user wants a dim screen in total appearance, the image display apparatus may refrain from control for the specific brightness variation when the lamp tube current i is not more than the current $i_0$, or may lower the current $i_0$ being the control reference value and carry out control so that the lamp tube current i becomes the current value lower than the current $i_0$.

In the twelfth embodiment, the reference light adjustment control data is assumed to be the light adjustment control data for the lamp tube current to maximize the light-emitting efficiency of the light source, but it may be the light adjustment control data for an optimal lamp tube current determined based on the lamp life and brightness required as a product.

Further, in the twelfth embodiment, described is the case that light adjustment control of the light source 128 is carried out based on the average brightness level (APL) of an input video signal. Alternatively, it is also possible to carry out light adjustment control of the light source 128 based on the maximum brightness level, minimum brightness level, or combination of those with the average brightness level of the video signal.

Still further, in the ninth to the twelfth embodiments, the description is made on the assumption that the light source 18 (or 128) is exemplarily a fluorescence lamp, but other forms of a lamp may be used as the light source as well.

INDUSTRIAL APPLICABILITY

As described, the image display apparatus and the image display method of the present invention can be utilized for a purpose of, when dynamically adjusting contrast and light source brightness according to an input video signal, visually improving a sense of contrast without increasing the power consumption of the light source by correlating contrast adjustment with the light source brightness adjustment, for a purpose of dynamically and optimally adjusting the intensity of the light source according to an input video signal by utilizing a range in the vicinity of a characteristic to maximize the light-emitting efficiency of the light source, and further, for a purpose of dynamically and optically adjusting the intensity of the light source according to an input video signal while securing the life of the light source required as a product.

The invention claimed is:

1. An image display apparatus for displaying an image on a passive light modulation part including a light source, said apparatus comprising:
   a video signal input part for inputting a video signal; and
   a light source control part for controlling a brightness of the light source,
   wherein said video signal input part and said light source control part are connected via a high-pass filter which has a time constant to control a rise in temperature of the light source, said high-pass filter being operable to control a current to a lamp tube of the light source so as to control the rise in temperature of the light source.

2. The image display apparatus according to claim 1, wherein a signal to be inputted to said high-pass filter is generated in accordance with the video signal.

3. An image display apparatus for displaying an image on a passive light modulation part including a light source, said apparatus comprising:
   a high-pass filter to which a signal for dynamically controlling a brightness of the light source is inputted;
   an addition part for adding a signal outputted from said high-pass filter to a reference light adjustment control signal which is generated based on the light-emitting efficiency of the light source; and
   a light source control section for controlling the brightness of the light source in accordance with a signal outputted from said addition part.

4. The image display apparatus according to claim 3, wherein a signal to be inputted to said high-pass filter is generated in accordance with the video signal.

5. An image display apparatus for displaying an image on a passive light modulation part including a light source, said apparatus comprising:
   a high-pass filter to which a signal for controlling a brightness of the light source is inputted;
   an addition part for adding a reference light adjustment control signal with a fixed value to a signal outputted from said high-pass filter; and
   a light source control section for controlling the brightness of the light source in accordance with a signal outputted from said addition part,
   wherein the reference light adjustment control signal is determined such that when a signal identical to the reference light adjustment control signal is outputted from said addition part, the light-emitting efficiency of the light source becomes maximum.

6. The image display apparatus according to claim 5, further comprising a control data generation part for generating a signal for controlling the brightness of the light source, in accordance with a video signal to be inputted to said image display apparatus.

7. An image display method of displaying an image on a passive light modulation part including a light source, said method comprising:
   a video signal input step of inputting a video signal;
   a light source control step of controlling a brightness of the light source; and
   a low frequency removing step of removing low frequency components to control a rise in temperature of the light source by having a time constant, between said video signal input step and said light source control step, said low frequency removing step comprising controlling a current to a lamp tube of the light source so as to control the rise in temperature of the light source.

8. The image display method according to claim 7, wherein said low frequency removing step comprises removing the low frequency components of a signal generated in accordance with the video signal.

9. An image display method of displaying an image on a passive light modulation part including a light source, said method comprising:
   a low frequency removing step of removing low frequency components of a signal for dynamically controlling a brightness of the light source;
   an addition step of adding a signal obtained as a result of said low frequency removing step to a reference light adjustment control signal which is generated based on the light-emitting efficiency of the light source; and
   a light source control step of controlling the brightness of the light source in accordance with a signal obtained as a result of said addition step.

10. The image display method according to claim 9, wherein said low frequency removing step comprises removing the low frequency components of a signal generated in accordance with the video signal.

11. An image display method of displaying an image on a passive light modulation part including a light source, said method comprising:
- a low frequency removing step of removing low frequency components of a signal for controlling a brightness of the light source;
- an addition step of adding a reference light adjustment control signal with a fixed value to a signal obtained as a result of said low frequency removing step; and
- a light source control step of controlling the brightness of the light source in accordance with a signal obtained as a result of said addition step, wherein the reference light adjustment control signal is determined such that when a signal identical to the reference light adjustment control signal is obtained as a result of said addition step, the light-emitting efficiency of the light source becomes maximum.

12. The image display method according to claim 11, further comprising a control data generation step of generating a signal for controlling the brightness of the light source, in accordance with a video signal to be inputted.

* * * * *